United States Patent

Hirschmann et al.

[11] Patent Number: 6,063,456
[45] Date of Patent: May 16, 2000

[54] STN LIQUID-CRYSTAL DISPLAY

[75] Inventors: Harald Hirschmann, Darmstadt; Sven Schüpfer, Aschaffenburg; Volker Reiffenrath, Rossdorf; Sabine Schoen, Darmstadt, all of Germany

[73] Assignee: Merck Patent Gesellschaft mit Beschrankter Haftung, Germany

[21] Appl. No.: 09/127,808

[22] Filed: Aug. 3, 1998

[30] Foreign Application Priority Data

Aug. 2, 1997 [DE] Germany .............. 197 33 522

[51] Int. Cl.[7] .............. C09K 19/34; C09K 19/30; G02F 1/133

[52] U.S. Cl. .............. 428/1; 252/299.61; 252/299.63; 349/179; 349/181

[58] Field of Search .............. 252/299.61, 299.63, 252/299.01; 349/179, 181, 136; 428/1

[56] References Cited

U.S. PATENT DOCUMENTS

| | | | |
|---|---|---|---|
| 5,372,746 | 12/1994 | Buchecker et al. | 252/299.61 |
| 5,626,792 | 5/1997 | Wand et al. | 252/299.01 |
| 5,658,489 | 8/1997 | Higashii et al. | 252/299.01 |

*Primary Examiner*—Shean C. Wu
*Attorney, Agent, or Firm*—Millen, White, Zelane, & Branigan, P.C.

[57] ABSTRACT

Supertwist liquid-crystal displays (SLCDs) with outstanding properties are obtained if the nematic liquid-crystal mixtures used therein comprise at least one compound selected from the formulae 1A and 1B

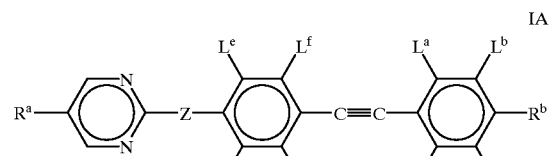

and at least one compound of the formula 1C

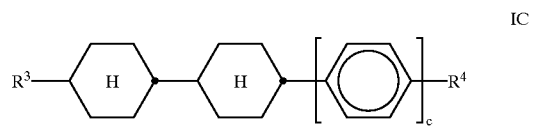

in which $R^a$ is alkyl, alkoxy, alkenyl or alkenyloxy having 1 to 12 carbon atoms, $R^b$ is alkyl or alkoxy having 1 to 5 carbon atoms, Z is —COO—, —CH$_2$CH$_2$— or a single bond, and $L^a$, $L^b$, $L^c$, $L^d$, $L^e$, $L^f$, $L^g$, and $L^h$ in each case independently of one another are H or F, with the proviso that the 1,4-phenylene rings carry not more than 2 fluorine atoms per ring, $R^3$ is an alkenyl group having 2 to 7 carbon atoms, $R^4$ is $R^a$ or $R^3$ and c is 0 or 1.

20 Claims, No Drawings

STN LIQUID-CRYSTAL DISPLAY

The invention relates to supertwist liquid-crystal displays (SLCDs) or supertwisted nematic (STN) displays having very short response times and good steepnesses and angle dependencies, and to the new nematic liquid-crystal mixtures used therein.

BACKGROUND OF THE INVENTION

SLCDs as defined in the preamble are known, for example from EP 0 131 216 B1; DE 34 23 993 A1; EP 0 096 070 A2; M. Schadt and F. Leenhouts, 17th Freiburg Congress on Liquid Crystals (8.-10.04.87); K. Kawasaki et al., SID 87 Digest 391 (20.6); M. Schadt and F. Leenhouts, SID 87 Digest 372 (20.1); K. Katoh et al., Japanese Journal of Applied Physics, Vol. 26, No. 11, L 1784-L 1786 (1987); F. Leenhouts et al., Appl. Phys. Lett. 50 (21), 1468 (1987); H. A. van Sprang and H. G. Koopman, J. Appl. Phys. 62 (5), 1734 (1987); T. J. Scheffer and J. Nehring, Appl. Phys. Lett. 45 (10), 1021 (1984), M. Schadt and F. Leenhouts, Appl. Phys. Lett. 50 (5), 236 (1987) and E. P. Raynes, Mol. Cryst. Liq. Cryst. Letters Vol. 4 (1), pp. 1–8 (1986). The term SLCD here covers any more highly twisted display element with a value for the twist angle of between 160° and 360°, such as, for example, the display elements of Waters et al. (C.M. Waters et al., Proc. Soc. Inf. Disp. (New York) (1985) (3rd Intern. Display Conference, Kobe, Japan), STN-LCDs (DE-A 35 03 259), SBE-LCDs (T.J. Scheffer and J. Nehring, Appl. Phys. Lett. 45 (1984) 1021), OMI-LCDs (M. Schadt and F. Leenhouts, Appl. Phys. Lett. 50 (1987), 236, DST-LCDs (EP-A 0 246 842) or BW-STN-LCDs (K. Kawasaki et al., SID 87 Digest 391 (20.6)).

SLCDs of this type are distinguished, in comparison to standard TN displays, by significantly better steepnesses of the electrooptical characteristic line and consequently better contrast values, and by significantly less angle dependence of the contrast. Of particular interest are SLCDs having very short response times, in particular also at relatively low temperatures. In order to achieve short response times, the rotational viscosities of the liquid-crystal mixtures were hitherto optimized using usually monotropic additives having relatively high vapour pressure. However, the response times achieved were not adequate for all applications.

In order to achieve a steep electrooptical characteristic line in SLCDs, the liquid-crystal mixtures should have relatively large values for $K_{33}/K_{11}$ and relatively small values for $\Delta\epsilon/\epsilon_\perp$.

In addition to optimization of the contrast and the response times, further important requirements are made of mixtures of this type:

1. A broad d/p window
2. Hich long-term chemical stability
3. High electrical resistance
4. Low frequency and temperature dependence of the threshold voltage.

The parameter combinations achieved are still far from adequate, in particular for high-multiplex, but also for low- and medium-multiplex STNs (1/400). This is in some cases attributable to the fact that the various requirements are affected in opposite manners by material parameters.

There thus continues to be a great demand for SLCDs, in particular for high-resolution displays (XGA), having very short response times and at the same time a large operating temperature range, high characteristic line steepness, good angle dependence of the contrast and low threshold voltage which meet the abovementioned requirements.

SUMMARY OF THE INVENTION

The invention has an object of providing SLCDs which do not have the abovementioned disadvantages, or only do so to a lesser extent, and at the same time have very good response times.

It has now been found that this object can be achieved if nematic liquid-crystal mixtures are used which comprise at least one compound selected from the formulae IA and IB

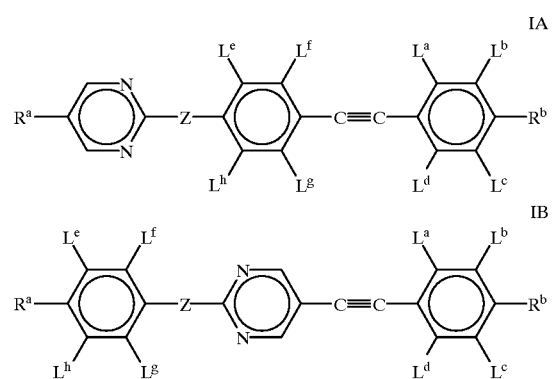

in which
R$^a$ is alkyl, alkoxy, alkenyl or alkenyloxy having 1 to 12 carbon atoms,
R$^b$ is alkyl or alkoxy having 1 to 5 carbon atoms,
Z is —COO—, —CH$_2$CH$_2$— or a single bond, and
L$^a$, L$^b$, L$^c$, L$^d$, L$^e$, L$^f$, L$^g$ and L$^h$ in each case independently of one another are H or F,
with the proviso that the 1,4-phenylene rings carry not more than 2 fluorine atoms per ring,
and at least one compound of the formula IC

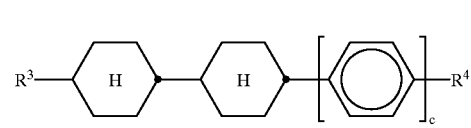

in which

| | |
|---|---|
| R$^3$ | is an alkenyl group having 2 to 7 carbon atoms, |
| R$^4$ | is R$^a$ or R$^3$, and |
| c | is 0 or 1. |

The use of compounds of the formulae IA and/or IB and IC in the mixtures for SLCDs according to the invention produces, in particular, very fast response times.

Furthermore, the mixtures according to the invention are distinguished by the following advantages:
they have low viscosity,
they have low temperature dependence of the threshold voltage and the operating voltage, and
they effect long storage times of the display at low temperatures.

Upon further study of the specification and appended claims, further objects and advantages of this invention will become apparent to those skilled in the art.

The invention thus includes a liquid-crystal display containing two outer plates which, together with a frame, form a cell, a nematic liquid-crystal mixture of positive dielectric anisotropy which is present in the cell, electrode layers with alignment layers on the insides of the outer plates, a pretilt angle between the longitudinal axis of the molecules at the surface of the outer plates and the outer plates of from about 1 degree to 30 degrees, and a twist angle of the liquid-crystal mixture in the cell from alignment layer to alignment layer with a value of between 100° and 600°, a nematic liquid-crystal mixture consisting of
  a) 10–65% by weight of a liquid-crystalline component A consisting of one or more compounds having a dielectric anisotropy of greater than +1.5;
  b) 20–90% by weight of a liquid-crystalline component B consisting of one or more compounds having a dielectric anisotropy of between −1.5; and +1.5;
  c) 0–20% by weight of a liquid-crystalline component D consisting of one or more compounds having a dielectric anisotropy of below −1.5; and
  d) an optically active component C in such an amount that the ratio between the layer thickness (separation of the outer plates) and the natural pitch of the chiral nematic liquid-crystal mixture is from about 0.2 to 1.3, characterized in that the liquid-crystal mixture comprises at least one compound selected from the formulae IA and IB

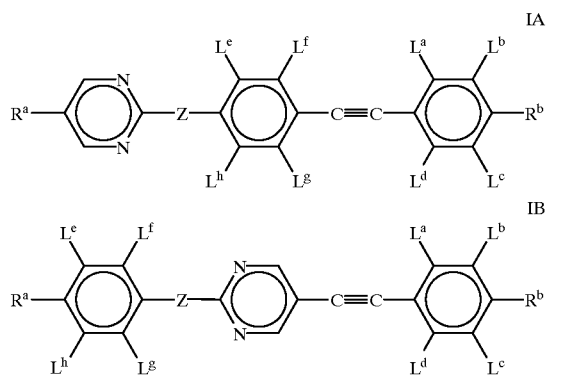

in which
  $R^a$ is alkyl, alkoxy, alkenyl or alkenyloxy having 1 to 12 carbon atoms,
  $R^b$ is alkyl or alkoxy having 1 to 5 carbon atoms,
  Z is —COO—, —CH$_2$CH$_2$— or a single bond, and
  $L^a$, $L^b$, $L^c$, $L^d$, $L^e$, $L^f$, $L^g$ and $L^h$ in each case independently of one another are H or F,
  with the proviso that the 1,4-phenylene rings carry not more than 2 fluorine atoms per ring,
  and component B comprises at least one compound of the formula IC

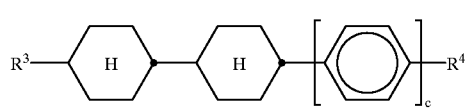

in which

| $R^3$ | is an alkenyl group having 2 to 7 carbon atoms, |
|---|---|
| $R^4$ | is $R^a$ or $R^3$, and |
| c | is 0 or 1. |

The invention also relates to corresponding liquid-crystal mixtures for use in SLCDs.

Preferred compounds of the formulae IA and IB are those compounds in which Z is a single bond and/or the 1,4-phenylene groups are substituted by not more than 2 fluorine atoms.

Particularly preferred compounds of formulae IA and IB are those compounds in which Z is a single bond and one of the 1,4-phenylene groups is

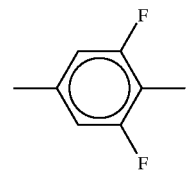

or

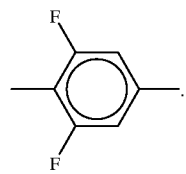

Further particularly preferred compounds of formulae IA and IB are those compounds in which Z is a single bond, one of the substituents $L^a$, $L^b$, $L^c$, $L^d$, $L^e$, $L^f$, $I^g$ and $L^h$ is F and the others are H. Particular preference is extended to compounds of the formulae IA and IB in which Z is a single bond and $L^a$, $L^b$, $L^c$, $L^d$, $L^e$, $L^f$, $L^g$ and $L^h$ are H.

Among the particularly preferred compounds of the formulae IA and IB particular preference is given to the compounds of subformulae IA1, IA2, IA3, IA4, IA5, IA6, IA7, IA8, IB1, IB2, IB3 and IB4

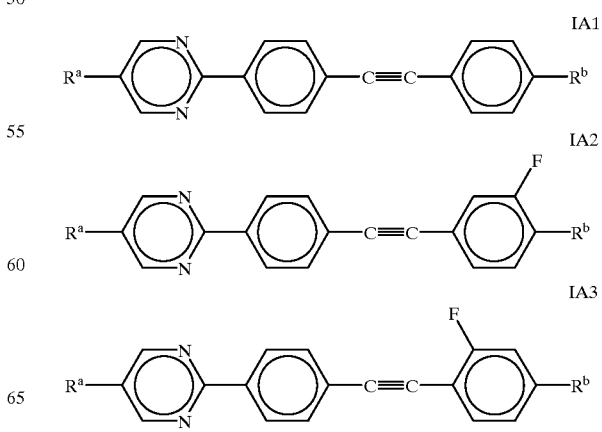

-continued

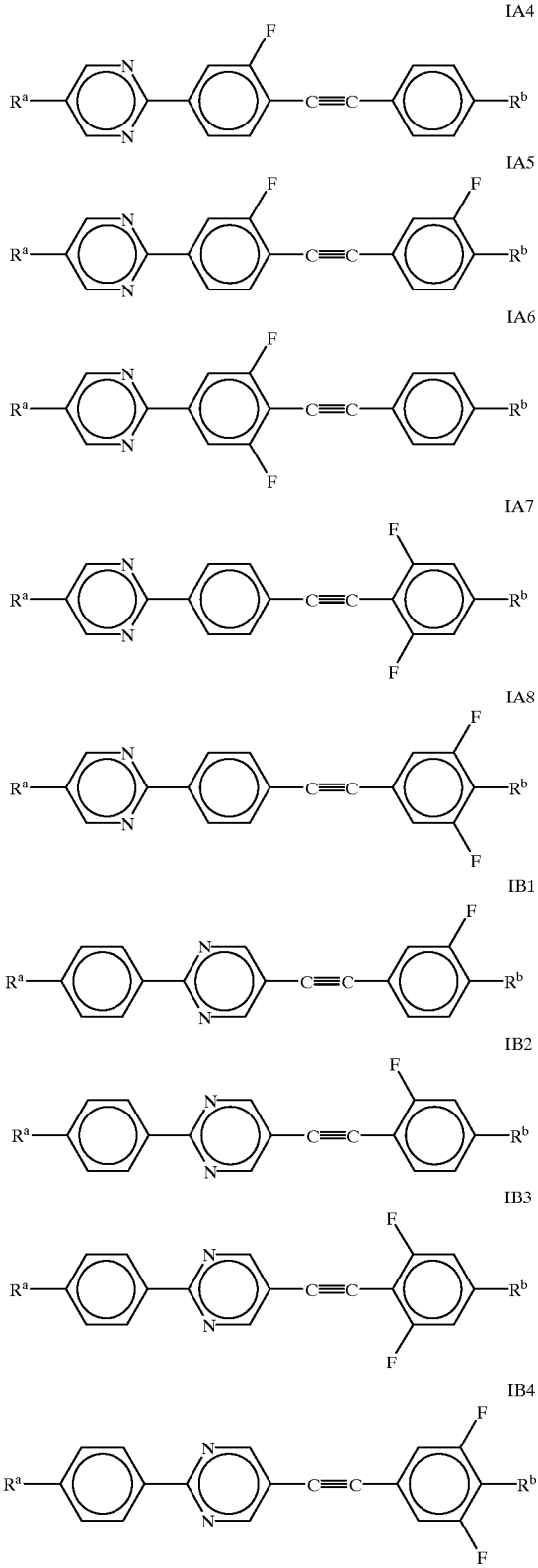

$R^a$ and $R^b$ are preferably straight-chain alkyl having 1 to 5 carbon atoms, or straight-chain alkoxy having 1 to 5 carbon atoms.

The formula IC embraces the following compounds

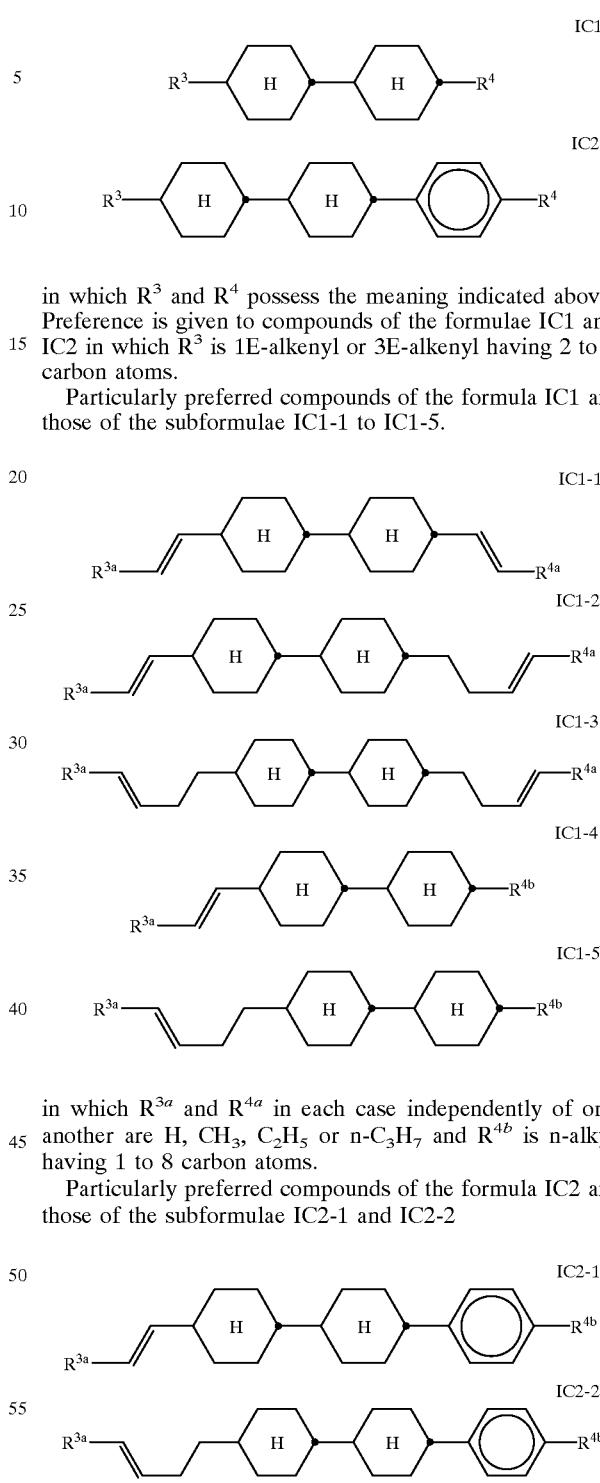

in which $R^3$ and $R^4$ possess the meaning indicated above. Preference is given to compounds of the formulae IC1 and IC2 in which $R^3$ is 1E-alkenyl or 3E-alkenyl having 2 to 7 carbon atoms.

Particularly preferred compounds of the formula IC1 are those of the subformulae IC1-1 to IC1-5.

in which $R^{3a}$ and $R^{4a}$ in each case independently of one another are H, $CH_3$, $C_2H_5$ or $n\text{-}C_3H_7$ and $R^{4b}$ is n-alkyl having 1 to 8 carbon atoms.

Particularly preferred compounds of the formula IC2 are those of the subformulae IC2-1 and IC2-2 in which $R^{3a}$ and $R^{4b}$ possess the meaning indicated under the compounds of the formulae IC1-1 to IC1-5.

Particular preference is given to liquid-crystal displays according to the invention in which component B comprises at least one compound selected from the formulae IC1-4, IC2-1 and IC2-2.

Component A preferably comprises compounds of the formulae II and/or III

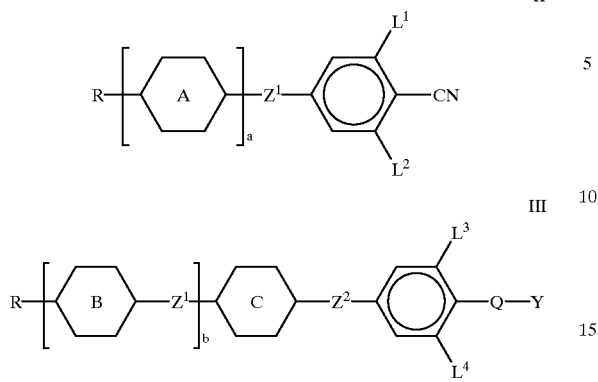

in which

R is an alkyl, alkoxy or alkenyl group having 1 to 12 carbon atoms, in which, in addition, one or two non-adjacent $CH_2$ groups may be replaced by —O—, —CH=CH—, —CO—, —OCO— or —COO—, in such a way that O atoms are not linked directly to one another,

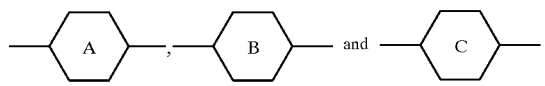

are each, independently of one another,

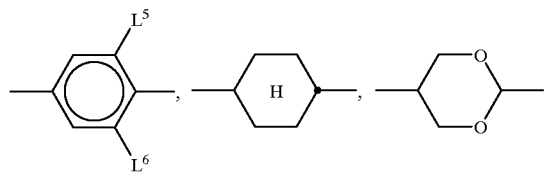

or

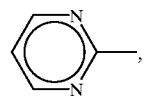

$L^1$ to $L^6$ are each, independently of one another, H or F,

| | |
|---|---|
| $Z^1$ | is —COO—, —$CH_2CH_2$— or a single bond, |
| $Z^2$ | is —$CH_2CH_2$—, —COO—, —C≡C— or a single bond, |
| Q | is —$CF_2$—, —CHF—, —$OCF_2$—, —OCHF— or a single bond, |
| Y | is F or Cl |
| a | is 1 or 2, and |
| b | is 0 or 1. |

Preferred compounds of the formula II conform to the subformulae IIa to IIh:

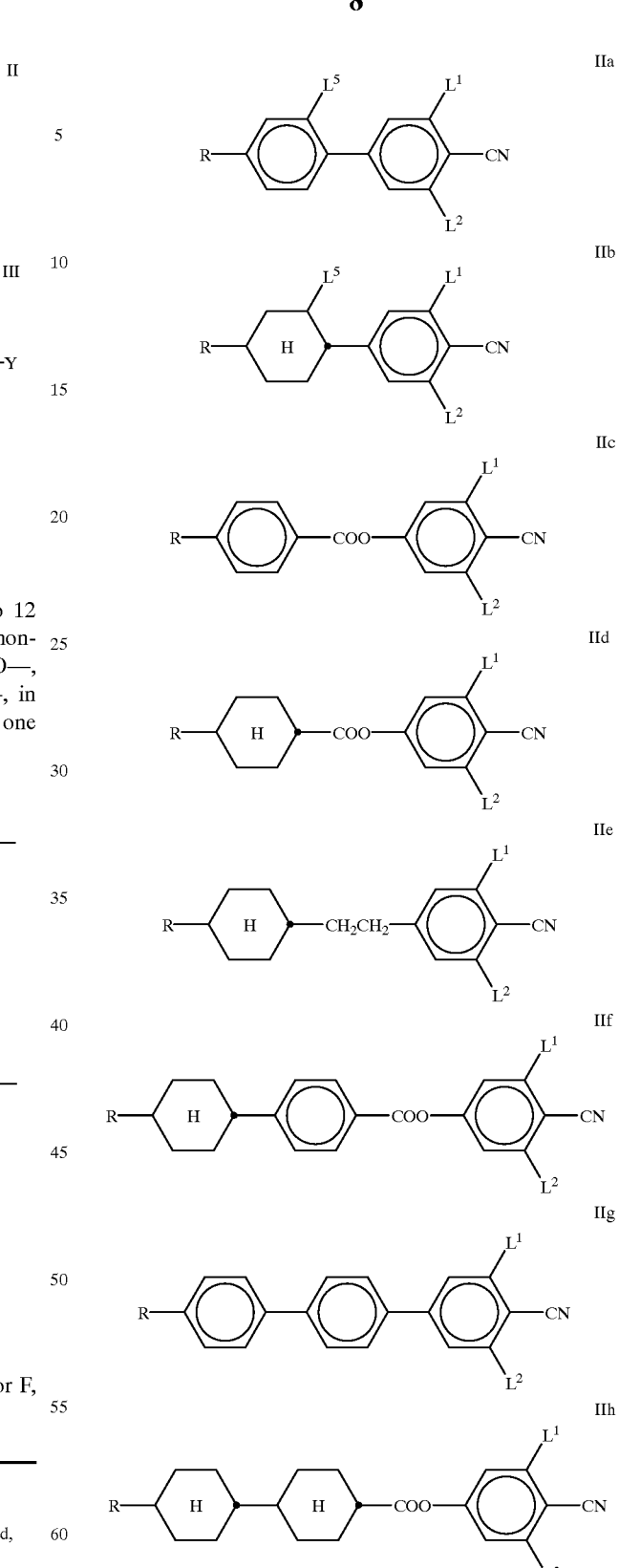

in which R, $L^1$, $L^2$ and $L^5$ are as defined above.

Particular preference is given to mixtures which comprise one or more compounds of the subformulae

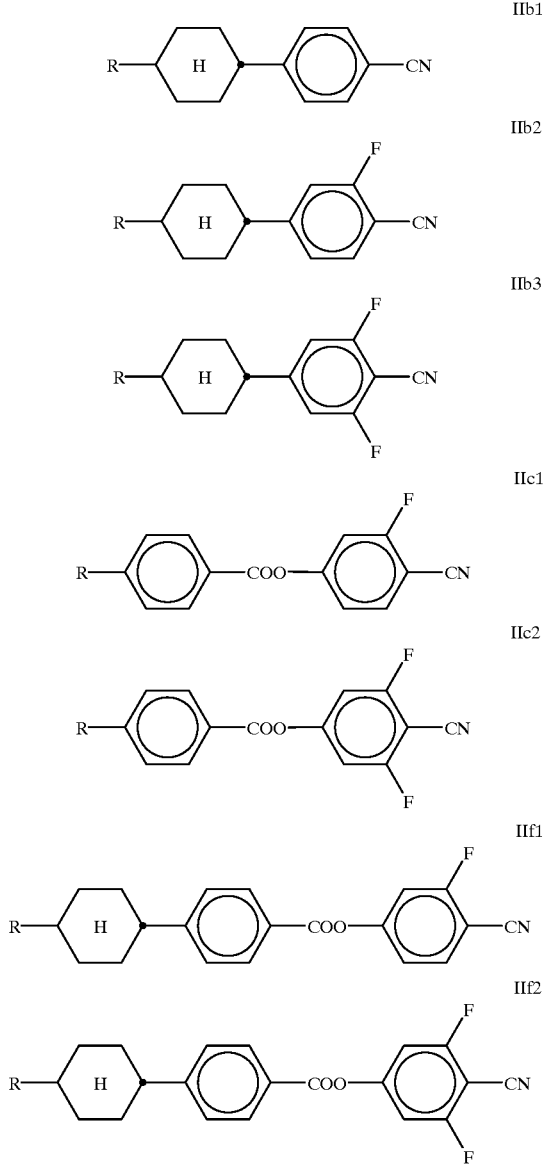

in which R is as defined above.

In a particularly preferred embodiment, component A additionally comprises compounds of the formulae AI to AIV:

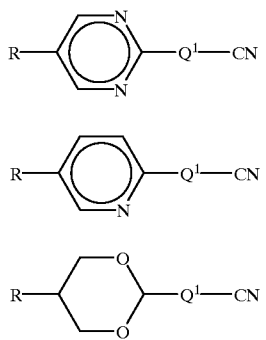

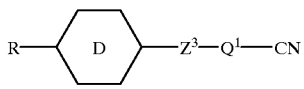

in which
R is an alkyl, alkoxy or alkenyl group having 1 to 12 carbon atoms, in which, in addition, one or two non-adjacent $CH_2$ groups may also be replaced by —O—, —CH=CH—, —CO—, —OCO— or —COO—, in such a way that O atoms are not linked directly to one another

and $Q^1$ are each, independently of one another,

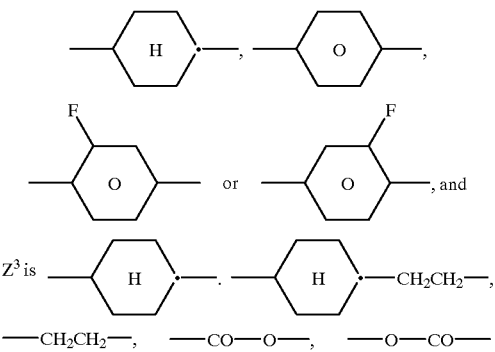

or a single bond.

The mixtures according to the invention preferably comprise one or more polar compounds having a high clearing point selected from the group consisting of the compounds AIV1 to AIV4:

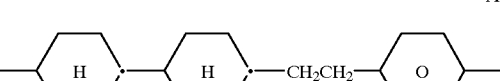

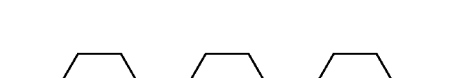

In the compounds AIV1 to AIV4, the 1,4-phenylene rings can also be laterally substituted by one or two fluorine atoms. Preferred compounds of this type are the compounds of the formulae AIV1-1, AIV1-2 and AIV1-3:
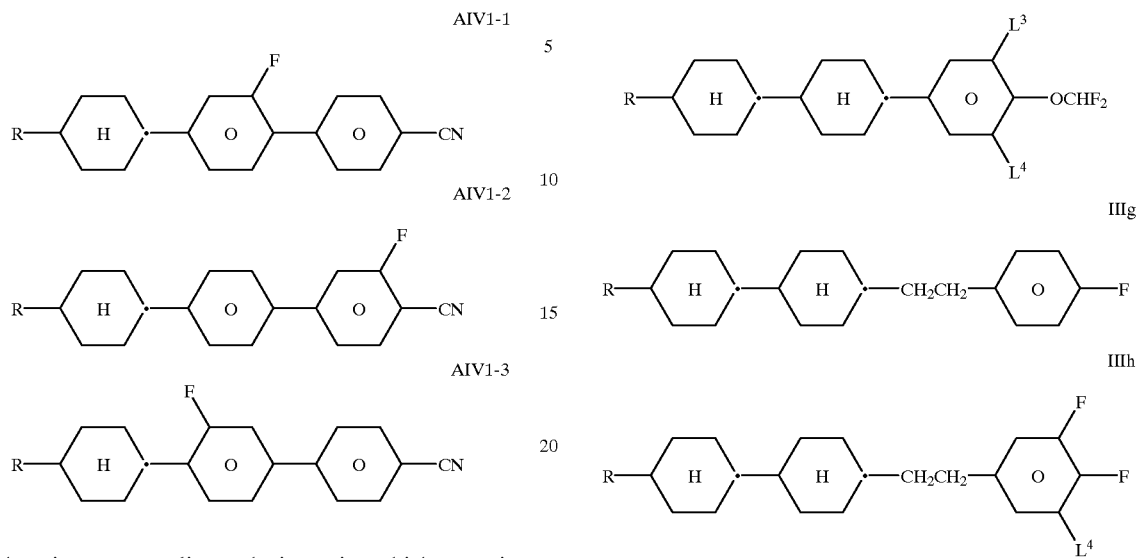
In the mixtures according to the invention which comprise compounds of the formulae AIV1 to AIV4, the proportion of these compounds is preferably from about 2 to 25%.
Preferred compounds of the formula III conform to the subformulae IIIa–IIIv:
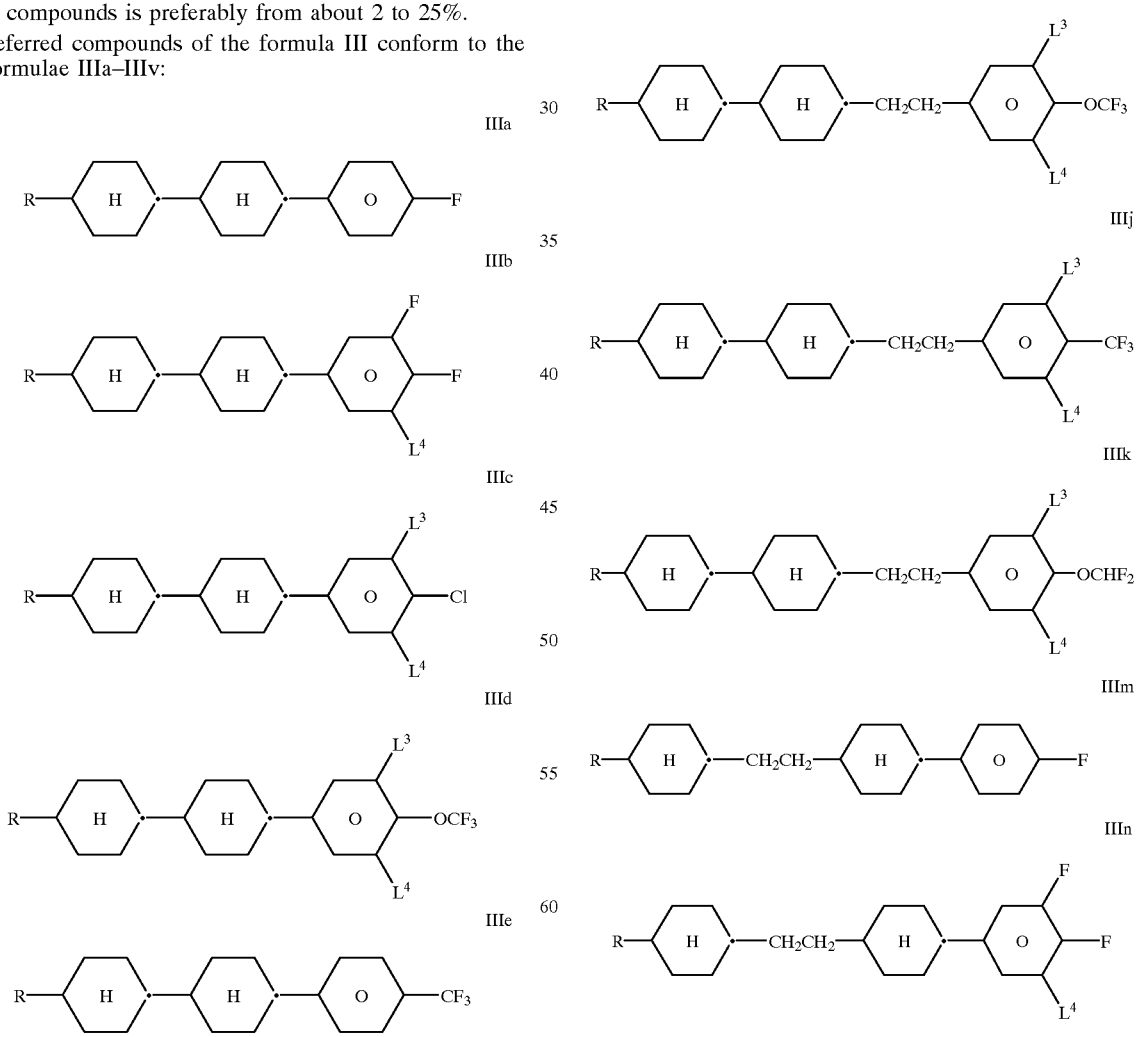

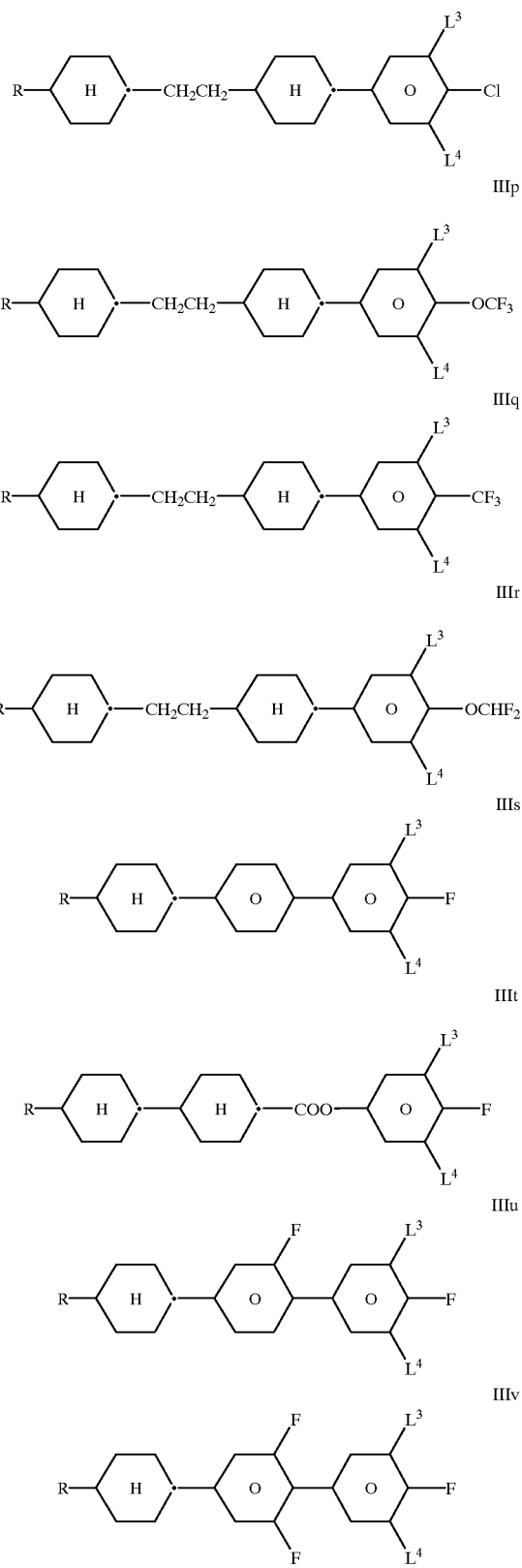

in which R is as defined above, and $L^3$ and $L^4$, independently of one another, are H or F.

Of the compounds of the formulae IIIa to IIIv, particular preference is given to those in which $L^3$ is F, furthermore those in which $L^3$ and $L^4$ are F.

In addition to one or more compounds of the formulae IA and/or IB and IC, preferred mixtures comprise one, two, three or more compounds of the formulae IIa, IIb, IIc, IIf, IIIb, IIId, IIIf, IIIh, IIIi, IIIs or IIIu, preferably one or more compounds of the formula IIIb, IIId, IIIh or IIIu, and from one to four compounds of the formulae IA and/or IB and Ic and from one to four compounds of the formulae IIa, IIb and/or IIc.

In the preferred compounds of the subformulae to the formulae II and III mentioned above and below, R, $R^1$ and $R^2$, unless stated otherwise, are preferably straight-chain alkyl, alkenyl or alkoxy, in particular alkyl, having 1 to 12 carbon atoms, in particular having 1 to 7 carbon atoms.

Preference is furthermore given to mixtures which comprise one or more compounds of the subformula IIIb1

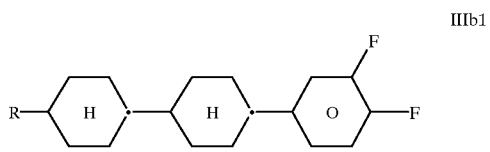

in which R is as defined in the formula III and is preferably alkyl having 1 to 7 carbon atoms or alkenyl having 2 to 7 carbon atoms, in particular 1E- or 3E-alkenyl having 2 to 7 carbon atoms.

In the compounds of the formula IIIb1, R is particularly preferably vinyl, 1E-propenyl, 1E-butenyl, 3E-butenyl, 3E-pentenyl, in particular vinyl.

The individual compounds, for example of the formulae II and III or their subformulae, or alternatively other compounds which can be used in the SLCDs according to the invention, are either known or can be prepared analogously to known compounds.

Preferred liquid-crystal mixtures comprise one or more compounds of component B, preferably from 30 to 75%. The compounds of component B are distinguished, in particular, by their low rotational viscosity values $\gamma_1$.

Component B preferably, in addition to one or more compounds of the formula IC, comprises one or more compounds selected from the group consisting of the compounds of the formulae IV1 to IV9:

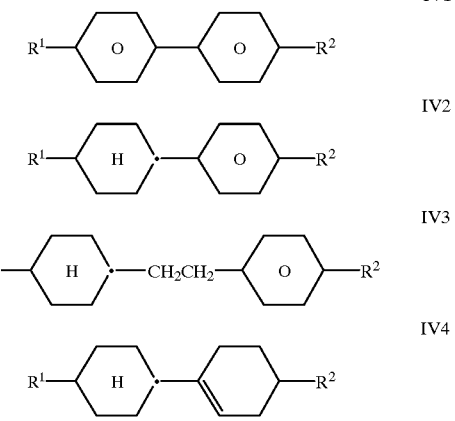

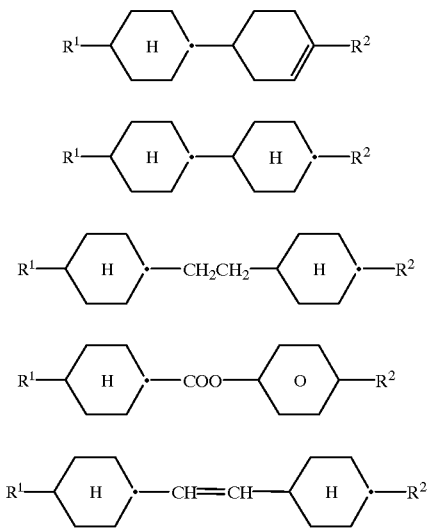

in which $R^1$ and $R^2$ are as defined for R, provided that a compound of formula IV6 is not the same as a compound of formula IC contained in the mixture.

Component B preferably additionally comprises one or more compounds selected from the group consisting of the compounds of the formulae IV10 to IV24:

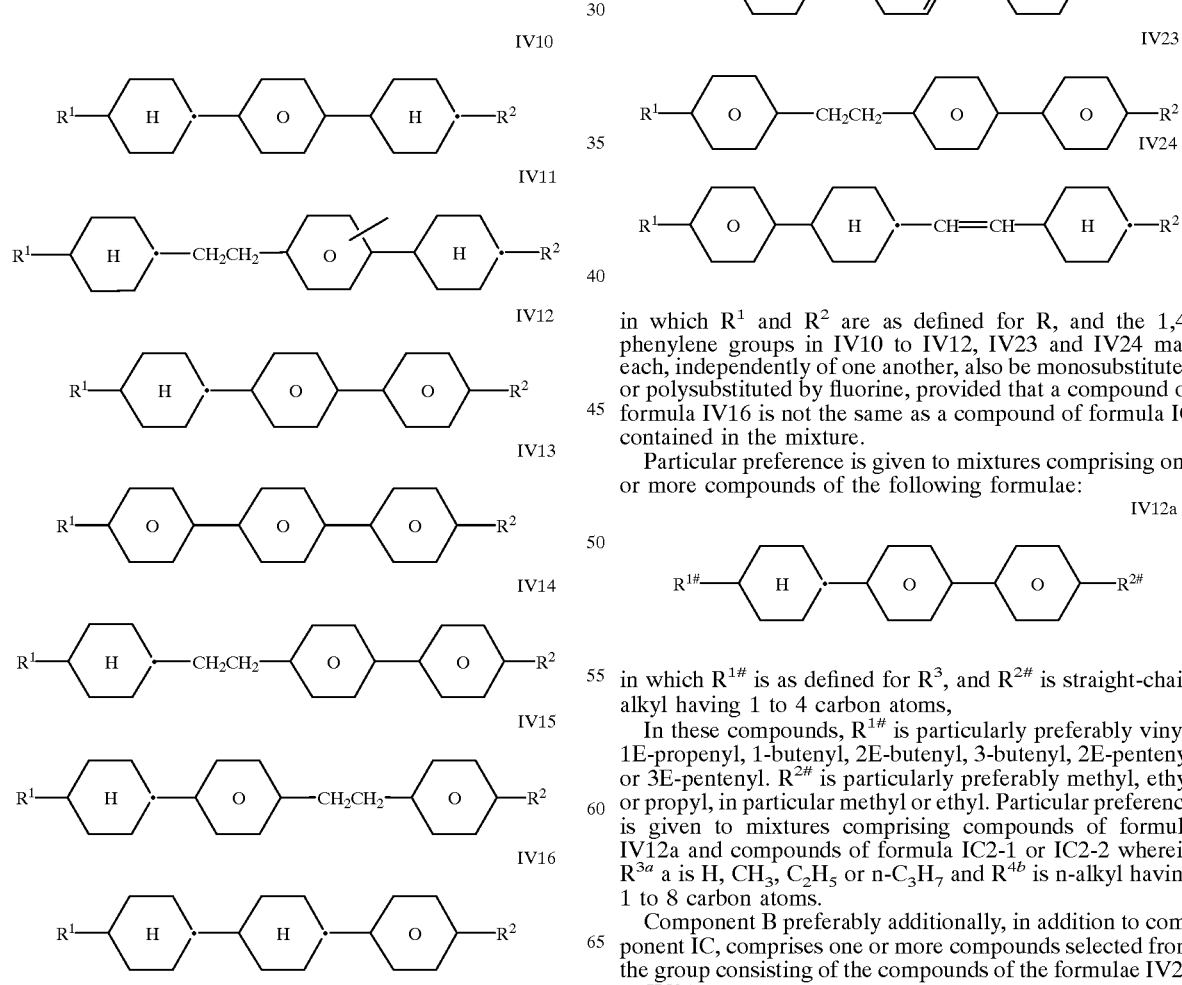

in which $R^1$ and $R^2$ are as defined for R, and the 1,4-phenylene groups in IV10 to IV12, IV23 and IV24 may each, independently of one another, also be monosubstituted or polysubstituted by fluorine, provided that a compound of formula IV16 is not the same as a compound of formula IC contained in the mixture.

Particular preference is given to mixtures comprising one or more compounds of the following formulae:

in which $R^{1\#}$ is as defined for $R^3$, and $R^{2\#}$ is straight-chain alkyl having 1 to 4 carbon atoms, In these compounds, $R^{1\#}$ is particularly preferably vinyl, 1E-propenyl, 1-butenyl, 2E-butenyl, 3-butenyl, 2E-pentenyl or 3E-pentenyl. $R^{2\#}$ is particularly preferably methyl, ethyl or propyl, in particular methyl or ethyl. Particular preference is given to mixtures comprising compounds of formula IV12a and compounds of formula IC2-1 or IC2-2 wherein $R^{3a}$ a is H, $CH_3$, $C_2H_5$ or $n-C_3H_7$ and $R^{4b}$ is n-alkyl having 1 to 8 carbon atoms.

Component B preferably additionally, in addition to component IC, comprises one or more compounds selected from the group consisting of the compounds of the formulae IV25 to IV31:

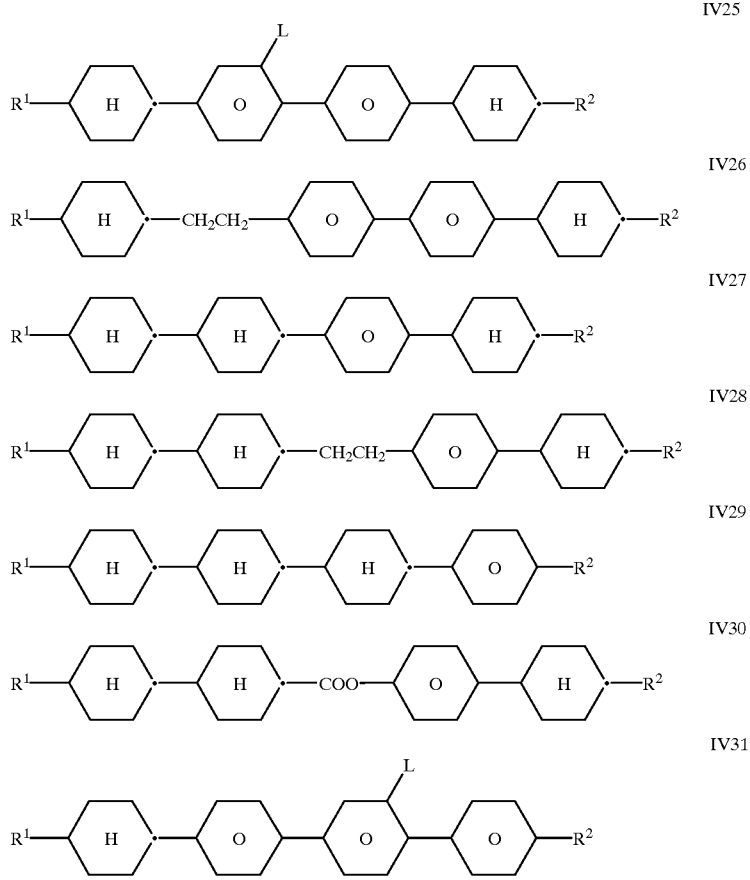

IV25

IV26

IV27

IV28

IV29

IV30

IV31 in which $R^1$ and $R^2$ are as defined for R, and L is F or H. The 1,4-phenylene groups in IV25 to IV31 may also each, independently of one another, be monosubstituted or polysubstituted by fluorine.

Particular preference is given to compounds of the formulae IV25 to IV31 in which $R^1$ is alkyl and $R^2$ is alkyl or alkoxy, in particular alkoxy, in each case having 1 to 7 carbon atoms. Preference is furthermore given to compounds of the formulae IV25 and IV31, in which L is F.

In the compounds of the formulae IV1 to IV31, $R^1$ and $R^2$ are particularly preferably straight-chain alkyl or alkoxy having 1 to 12 carbon atoms.

Component B optionally comprises one or more compounds selected from the group consisting of the compounds of the formulae VI and VII:

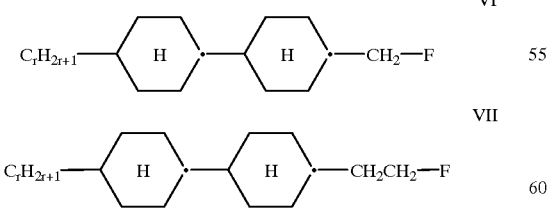

VI

VII in which $C_rH_{2r+1}$ is a straight-chain alkyl group having up to 9 carbon atoms.

In a further preferred embodiment, component B additionally comprises one or more compounds from the group of compounds of the formulae VIII and IX

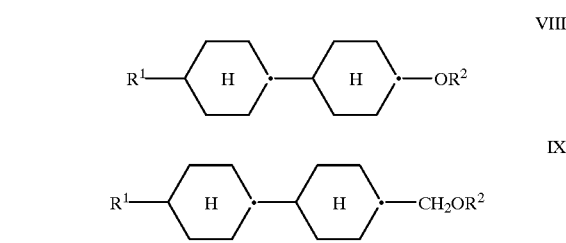

VIII

IX in which $R^1$ and $R^2$ are as defined above, provided that the compounds of formula VIII or IX are different from those of formula IC, in a given mixture.

Furthermore preferred liquid-crystal mixtures comprise at least one component selected from the group consisting of the compounds of the formulae X to XIV:

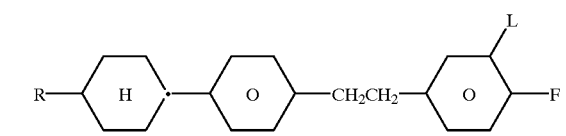

X

-continued

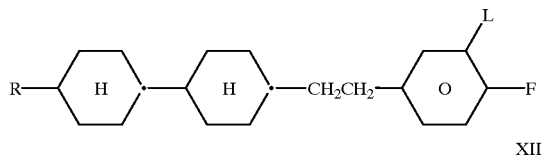

XI

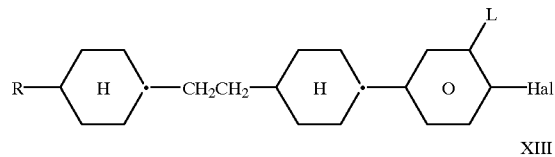

XII

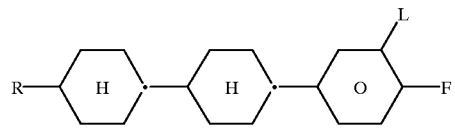

XIII

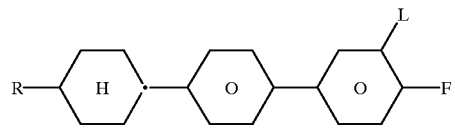

XIV in which Hal is F or Cl, L is H or F, and R is as defined above, in particular alkyl having 1 to 12 carbon atoms.

The liquid-crystal mixtures optionally comprise an optically active component C in such an amount that the ratio between the layer thickness (separation of the outer plates) and the natural pitch of the chiral nematic liquid-crystal mixture is greater than 0.2. For the component, a multiplicity of chiral dopants, some commercially available, is available to the person skilled in the art, for example such as cholesteryl nonanoate, S-811 from Merck KGaA, Darmstadt, FRG, and CB 15 (BDH, Poole, UK). The choice of dopants is not crucial per se.

The proportion of the compounds of component C is preferably from 0 to 10%, in particular from 0 to 5%, particularly preferably from 0 to 3%.

In a particularly preferred embodiment, the mixtures according to the invention comprise from about 5 to 35%, in particular from 5 to 25%, of liquid-crystalline tolan compounds. This enables smaller layer thicknesses to be used, significantly shortening the response times. The tolan compounds are preferably selected from group T consisting of the compounds of the formulae T1 and T2:

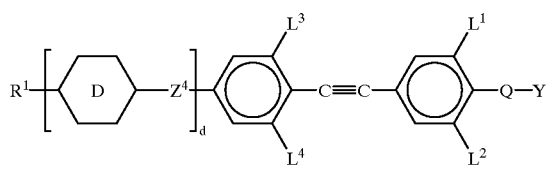

T1

-continued

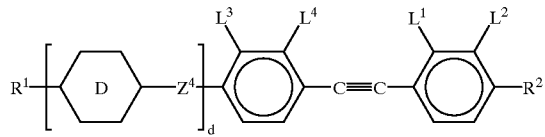

T2 in which

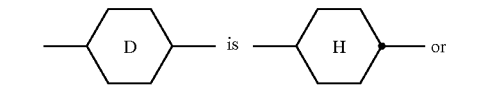

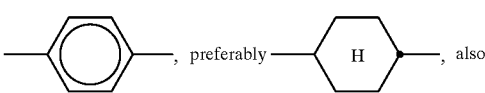

formula T2,

| d | is 0 or 1, |
|---|---|

$L^1$ to $L^6$ are each, independently of one another, H or F,

| Q | is —$CF_2$—, —CHF—, —$OCF_2$—, —OCHF— or a single bond, |
|---|---|
| Y | is F or Cl, |
| $Z^4$ | is —CO—O—, —$CH_2CH_2$— or a single bond, and |
| $R^1$ and $R^2$ | are each as defined above. |

$R^1$ and $R^2$ are each as defined above.

Preferred compounds of the formula T1 conform to the subformulae T1a and T1b

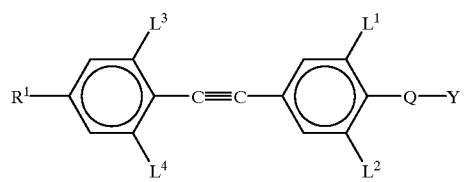

T1a

-continued

T1b
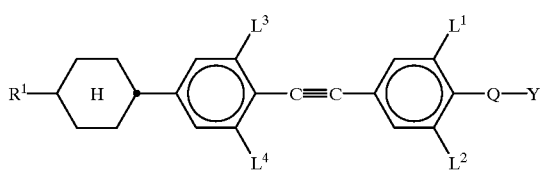

in which $R^1$ is as defined above, $L^1$ to $L^4$ are each, independently of one another, H or F, and Q-Y is F, Cl or $OCF_3$, in particular F or $OCF_3$.

Preferred compounds of the formula T2 conform to the subformulae T2a to T2g

T2a
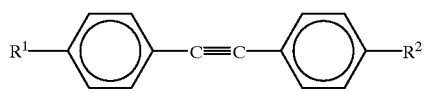

T2b
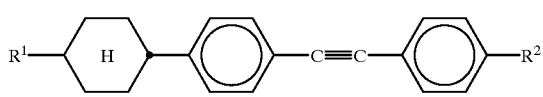

T2c
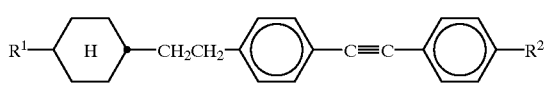

T2d
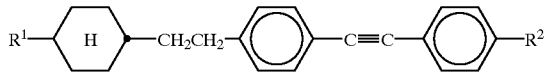

T2e
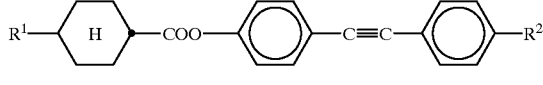

T2f
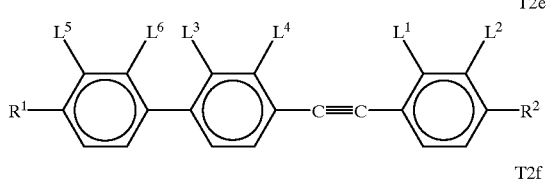

T2g
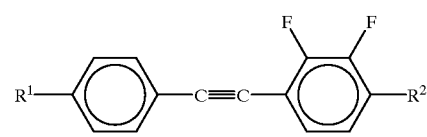

in which $R^1$, $R^2$ and $Z^4$ are as defined above, and $L^1$ to $L^6$ are each, independently of one another, H or F.

Particularly preferred compounds of the formula T2e are those in which one, two or three of the radicals $L^1$ to $L^6$ are F and the others are H, where $L^1$ and $L^2$ or $L^3$ and $L^4$ or $L^5$ and $L^6$ are not both simultaneously F.

The proportion of compounds from the group T is preferably from 5 to 30%, in particular from 5 to 25%.

In a further particularly preferred embodiment, the mixtures according to the invention preferably comprise from about 5 to 20% of one or more compounds having a dielectric anisotropy Δε of less than −1.5 (component D).

Component D preferably comprises one or more compounds containing the structural unit 2,3-difluoro-1,4-phenylene, for example compounds as described in DE-A 38 07 801, 38 07 861, 38 07 863, 38 07 864 or 38 07 908. Particular preference is given to tolans containing this structural unit, as described in International Patent Application PCT/DE 88/00133, in particular those of the formulae T2f and T2g.

Further known compounds of component D are, for example, derivatives of 2,3-dicyanohydroquinones or cyclohexane derivatives containing the structural unit

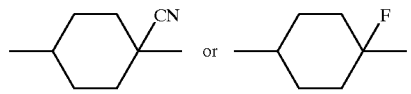

as described in DE-A 32 31 707 or DE-A 34 07 013 respectively.

The liquid-crystal mixture according to the invention preferably comprises one or more compounds selected from group B1 consisting of compounds of the formulae B1I to B1IV:

B1I
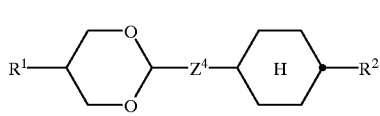

B1II
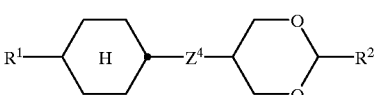

B1III
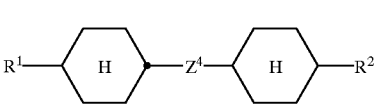

B1IV
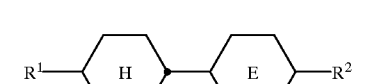

in which
$R^1$, $R^2$ and $Z^4$ are as defined above and

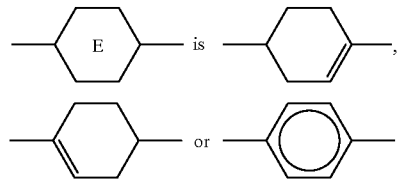

provided that compounds of the formula B1III are different from compounds of the formula IC for a given mixture, and/or at least one compound selected from group B2 consisting of compounds of the formulae B2I to B2III:

B2I
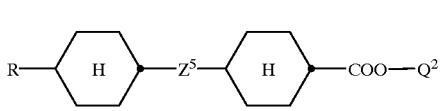

-continued

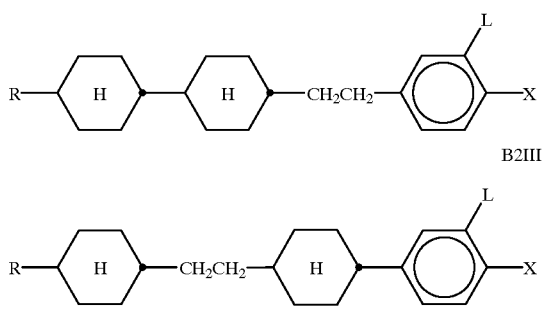
B2II

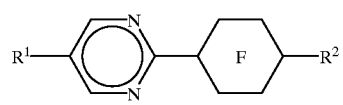
B2III in which

| R | is as defined above, |
|---|---|
| $Z^5$ | is —CH$_2$CH$_2$—, —CO—O— or a single bond, |

$Q^2$

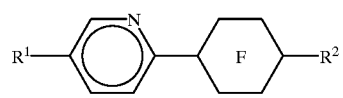

alkyl is an alkyl group having 1 to 9 carbon atoms,

| X | is CN or F, and |
|---|---|
| L | is H or F, | and/or at least one compound selected from group B3 consisting of compounds of the formulae B3I to B3III:

B3I

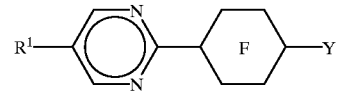

B3II

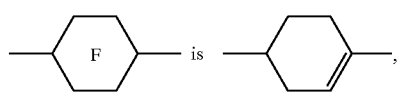

B3III in which $R^1$ and $R^2$, independently of one another, are as defined above, Y is F or Cl, and

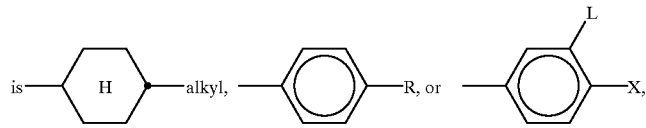

-continued

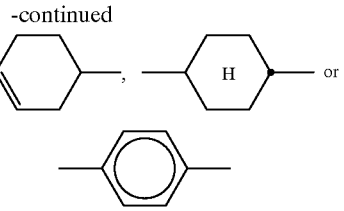

The proportion of the compounds from group B1 is preferably from 10 to 50%, in particular from 15 to 40%. Compounds of the formulae B1III and B1IV are preferred.

Particularly preferred compounds of group B1 are those of the following subformulae:

B1IIIa

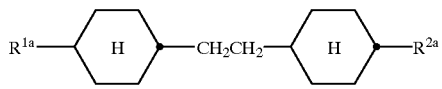

B1IIIb

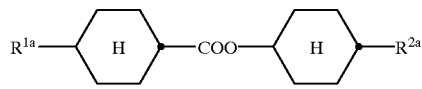

B1IVa

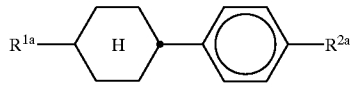

in which

| $R^{1a}$ | is CH$_3$—(CH$_2$)$_p$—, CH$_3$—(CH$_2$)$_p$—O—, |
|---|---|
| | CH$_3$—(CH$_2$)$_p$—O—CH$_2$—, |
| | trans-H—(CH$_2$)$_q$—CH=CH—(CH$_2$CH$_2$)$_s$— or |
| | trans-H—(CH$_2$)$_q$—CH=CH—(CH$_2$CH$_2$)$_s$—CH$_2$O—, |
| $R^{2a}$ | is CH$_3$—(CH$_2$)$_p$—, |
| p | is 1,2,3 or 4 |
| q | is 0,1,2, or 3, and |
| s | is 0 or 1. |

The proportion of the compounds of the abovementioned subformulae B1 IIIa and B1IIIb together with the compounds of the formula IC1 is preferably from about 5 to 45%, particularly preferably from about 10 to 35%.

The proportion of the compounds of the subformula B1IVa or of the compounds of the formula B1IV is preferably from about 5 to 40%, particularly preferably from about 10 to 35%.

In a particularly preferred embodiment, the mixtures simultaneously comprise compounds of the formulae B1 III and B1IV together with the compounds of the formulae IC1 and/or IC2, observing the total proportion for components from group B1.

If compounds of the formulae B1I and/or B1III are present, $R^1$ and $R^2$ are preferably each, independently of one another, n-alkyl having 1 to 7 carbon atoms or for compounds of formula B1I, additionally (trans)-n-alkenyl having 3 to 7 carbon atoms. $Z^4$ is preferably a single bond.

Preference is furthermore given to mixtures according to the invention which comprise one or more compounds of the formula B1IV in which

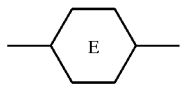

is

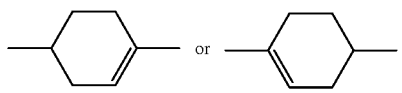

and $R^1$ and $R^2$ have one of the preferred meanings indicated above, and are particularly preferably n-alkyl having 1 to 7 carbon atoms.

In all cases, the total proportion of components from group B1 is observed.

The proportion of the compounds from group B2 is preferably from about 5 to 45%, in particular from 5 to 20%. The proportion (preferred ranges) for B2I to B2III is as follows:
B2I: from about 5 to 30%, preferably from about 5 to 15%, sum of B2II and B2III: from about 5 to 25%, preferably from about 10 to 20%.

Preferred compounds from group B2 are shown below:

B2Ia
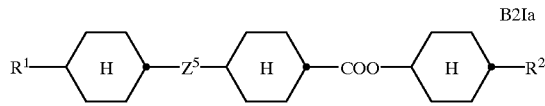

B2Ib
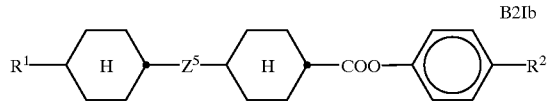

B2Ic

B2IIa
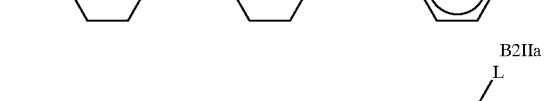

B2IIIa
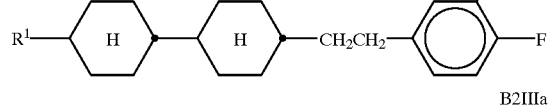

in which $R^1$, $R^2$, L and $Z^5$ are as defined above.

In these compounds, $R^1$ is preferably n-alkyl having 1 to 7 carbon atoms or (trans)-n-alkenyl having 3 to 7 carbon atoms, $Z^5$ is preferably a single bond, $R^2$ preferably has the preferred meaning given above for R or is fluorine, and L is preferably fluorine.

The mixtures according to the invention preferably comprise one or more compounds selected from the group consisting of B2Ic, B2IIa and B2IIIa in a total proportion of from about 5 to 35%.

In a particularly preferred embodiment, the mixtures according to the invention, in addition to B2Ic, B2IIa and B2IIIa (L=F), comprise further terminally fluorinated compounds, selected, for example, from the group consisting of F1
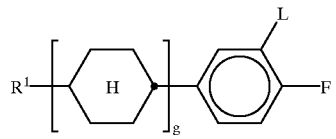

F2
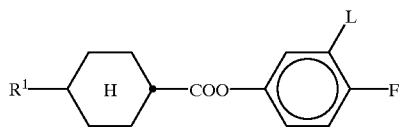

and/or polar heterocyclic compounds selected from the group consisting of

P1
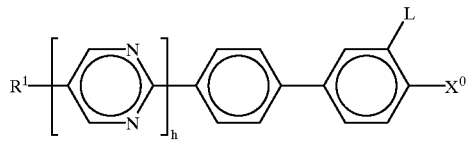

P2
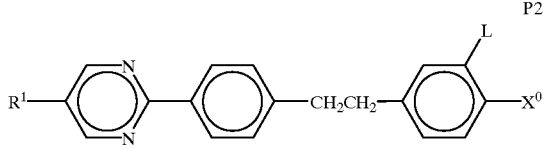

P3
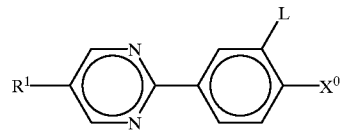

P4
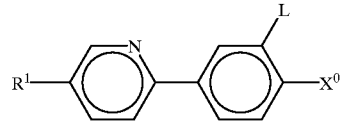

P5
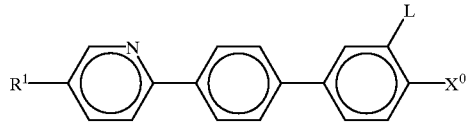

in which $R^1$ is preferably n-alkyl having 1 to 7 carbon atoms or (trans)-n-alkenyl having 3 to 7 carbon atoms, g is 1 or 2, h is 0 or 1, $X^0$ is F, Cl, $CF_3$, —$OCF_3$ or —$OCHF_2$, and L is H or F.

The total proportion of all terminally fluorinated compounds is preferably from about 5 to 65%, in particular from about 15 to 40%.

The proportion of compounds from group B3 is preferably from about 5 to 30%, particularly preferably from about 10 to 20%. $R^1$ is preferably n-alkyl or n-alkoxy, in each case having 1 to 9 carbon atoms.

However, it is also possible to employ analogous compounds containing alkenyl or alkenyloxy groups. Compounds of the formula B3I are preferred.

The terms "alkyl" and "alkoxy" in the definition of $R^a$, $R^b$, R, $R^1$, $R^2$ and $R^4$ embrace straight-chain and branched alkyl and alkoxy groups, in the case of $R^a$, R, $R^1$, $R^2$ and $R^4$ having 1–12, in the case of $R^b$ having 1–5 carbon atoms and especially the straight-chain groups. Particularly preferred alkyl and alkoxy groups are ethyl, propyl, butyl, pentyl, hexyl, heptyl, ethoxy, propoxy, butoxy, pentoxy, hexoxy or heptoxy, and also methyl, octyl, nonyl, decyl, undecyl, dodecyl, methoxy, octoxy, nonoxy, decoxy, undecoxy or dodecoxy.

The term "alkenyl" in the definition of $R^a$, R, $R^1$, $R^2$, $R^3$ and $R^4$ covers straight-chain and branched alkenyl groups, having 2–12 carbon atoms in the case of $R^a$, R, $R^1$, $R^2$ and $R^4$ and having 2–7 carbon atoms in the case of $R^3$, in particular the straight-chain groups. Particularly preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "alkenyloxy" in the definition of $R^a$ embraces straight-chain and branched alkenyloxy groups having 2–12 carbon atoms, especially the straight-chain groups. In particular it means vinyloxy, propyl-1- or -2-enyloxy, but-1-, -2- or -3-enyloxy, pent-1-, -2-, -3- or -4-enyloxy, hex-1-, -2-, -3-, -4- or -5-enyloxy or hept-1-, -2-, -3-, -4-, -5- or -6-enyloxy, and also oct-1-, -2-, -3-, -4-, -5-, -6- or -7-enyloxy, non-1-, -2-, -3-, -4-, -5-, -6-, -7- or -8-enyloxy, dec-1-, -2-, -3-, -4-, -5-, -6-, -7-, -8-, or -9-enyloxy, undec-1-, -2-, -3-, -4-, -5-, -6-, -7-, -8-, -9- or -10-enyloxy or dodec-1-, -2-, -3-, -4-, -5-, -6-, -7-, -8-, -9-, -10- or -11-enyloxy.

The mixtures according to the invention comprise compounds of the formulae IA and/or IB and IC and preferably compounds from at least one of groups B1, B2 and B3. They preferably comprise one or more compounds from group B1 and one or more compounds from group B2 and/or B3.

In a preferred embodiment, the liquid-crystalline media according to the invention comprise 3, 4, 5 or 6 compounds of the formulae IA and/or IB and IC; the content of these compounds is generally from 20 to 70% by weight, preferably from 40 to 70% by weight, based on the total.

In a further preferred embodiment, the mixtures comprise one or more compounds of the following formulae

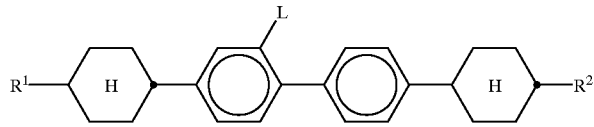

IV25

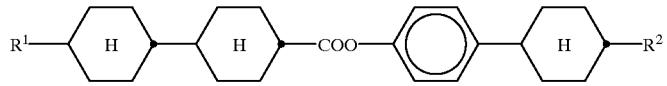

IV30 in which $R^1$, $R^2$ and L have the preferred meanings given under compounds of component B. The proportion of these compounds in the liquid-crystal mixtures is preferably from 0 to 45%, in particular from 5 to 30%;

one or more, in particular 1, 2, 3 or 4, compounds selected from the compounds of the formulae IIIb, IIId, IIIf, IIIh, IIIi, IIIs and IIIu;

at least two compounds selected from the compounds of the formulae IIb1, IIb2, IIb3, IIc1 and IIc2. The proportion of these compounds in the liquid-crystal mixtures is preferably from 0 to 60% by weight, particularly from 10 to 45%;

one or more compounds of the formula T1 or T2, in particular one or more compounds of the formula T2a and/or T2b, where the proportion of these compounds in the liquid-crystal mixtures is preferably from 0 to 25%, in particular from 1 to 15%.

Further particularly preferred embodiments relate to liquid-crystal mixtures comprising a least two compounds of the formula AI or AII;

one or more compounds in which R or $R^1$ is a trans-alkenyl group oγ trans-alkenyloxy group;

one or more compounds selected from the following group:

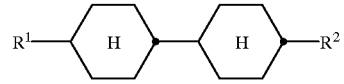

IV6

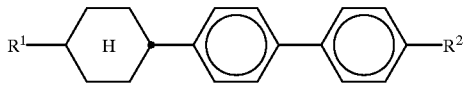

IV12

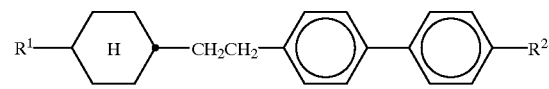

IV14 in which $R^1$ and $R^2$ have the preferred meanings given under compounds of component B provided that compounds of the formula IV6 are different from those of formula IC for a given mixture. The 1,4-phenylene groups in the abovementioned compounds can also be substituted by fluorine;

one or more compounds of the formulae

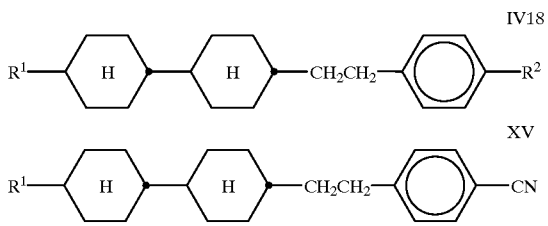

in which R, $R^1$ and $R^2$ are as defined above.

In particular when used in SLCDs having high layer thicknesses, the mixtures according to the invention are distinguished by very low overall response times ($t_{over}=t_{on}+t_{off}$). Low overall response times are an important criterion, in particular, in SLCDs :or use as displays in laptops in order to be able to display cursor movements without interference.

The liquid-crystal mixtures used in the STN cells according to the invention are dielectrically positive with $\Delta\epsilon \geq 1$. Particular preference is given to liquid-crystal mixtures where $\Delta\epsilon \geq 3$ and very particularly to those where $\Delta\epsilon \geq 5$.

The liquid-crystal mixtures according to the invention have favourable values for the threshold voltage $V_{(10, 0, 20)}$ and for the rotational viscosity $\gamma_1$. If the value for the optical path difference d.$\Delta$n is specified, the value for the layer thickness d is determined by the optical anisotropy $\Delta$n. In particular at relatively high values for d.$\Delta$n, the use of liquid-crystal mixtures according to the invention having a relatively high value for the optical anisotropy is generally preferred since the value for d can then be chosen to be relatively small, which results in more favourable values for the response times. However, liquid-crystal displays according to the invention which contain liquid-crystal mixtures according to the invention having relatively small values for $\Delta$n are also characterized by advantageous values for the response times.

The liquid-crystal mixtures according to the invention are furthermore characterized by advantageous values for the steepness of the electrooptical characteristic line and can be operated at high multiplex rates, in particular at temperatures above 20° C. In addition, the liquid-crystal mixtures according to the invention have high stability and favourable values for the electrical resistance and the frequency dependence of the threshold voltage. The liquid-crystal displays according to the invention have a broad operating temperature range and good angle dependence of the contrast.

The construction of the liquid-crystal display elements according to the invention from polarizers, electrode baseplates and electrodes with a surface treatment such that the preferential alignment (director) of the liquid-crystal molecules in each case adjacent thereto is usually twisted by a value of from 160° to 720° from one electrode to the next, corresponds to the structure which is conventional for display elements of this type. The term conventional structure here is broadly drawn and also includes all derivatives and modifications of the STN cell, in particular also matrix display elements, and display elements which contain additional magnets.

The surface tilt angle at the two outer plates may be identical or different. Identical tilt angles are preferred. In STN displays, the pretilt angle is from 1° to 30°, preferably from 1° to 12°, in particular from 3° to 10°.

The twist angle of the STN mixture in the display from alignment layer to alignment layer has a value of between 100° and 600°, preferably between 170° and 300°, in particular between 180° and 270°.

The liquid-crystal mixtures which can be used according to the invention are prepared in a manner which is known per se. In general, the desired amount of the components used in a lesser amount is dissolved in the components making up the principal constituent, expediently at elevated temperature. It is also possible to mix solutions of the components in an organic solvent, for example in acetone, chloroform or methanol, and, after mixing, to remove the solvent again, for example by distillation.

The dielectrics may also contain further additives which are known to a person skilled in the art and are described in the literature. For example, 0–15% of pleochroic dyes may be added.

The entire disclosure of all applications, patents and publications, cited above and below, and of corresponding German Application No. 197 33 522.5, filed Aug. 2, 1997 is hereby incorporated by reference.

In the present application and in the examples below, the structures of the liquid-crystal compounds are indicated by acronyms, the transformation into chemical formulae taking place in accordance with tables A and B below. All radicals $C_nH_{2n+1}$ and $C_mH_{2m+1}$ are straight-chain alkyl radicals having n and m carbon atoms respectively. The alkenyl radicals have the trans-configuration. The coding in Table B is self-evident. In Table A, only the acronym for the parent structure is given. In individual cases, the acronym for the parent structure is followed, separated by a dash, by a code for the substituents $R^1$, $R^2$, $L^1$, $L^2$ and $L^3$:

| Code for $R^1$, $R^2,L^1,$ $L^2,L^3$ | $R^1$ | $R^2$ | $L^1$ | $L^2$ | $L^3$ |
|---|---|---|---|---|---|
| nm | $C_nH_{2n+1}$ | $C_mH_{2m+1}$ | H | H | H |
| nOm | $OC_nH_{2n+1}$ | $C_mH_{2m+1}$ | H | H | H |
| nO.m | $C_nH_{2n+1}$ | $OC_mH_{2m+1}$ | H | H | H |
| n | $C_nH_{2n+1}$ | CN | H | H | H |
| nN.F | $C_nH_{2n+1}$ | CN | H | H | F |
| nN.F.F | $C_nH_{2n+1}$ | CN | H | F | F |
| nF | $C_nH_{2n+1}$ | F | H | H | H |
| nOF | $OC_nH_{2n+1}$ | F | H | H | H |
| nCl | $C_nH_{2n+1}$ | Cl | H | H | H |
| nF.F | $C_nH_{2n+1}$ | F | H | H | F |
| nmF | $C_nH_{2n+1}$ | $C_mH_{2m+1}$ | F | H | H |
| nCF$_3$ | $C_nH_{2n+1}$ | CF$_3$ | H | H | H |
| nOCF$_3$ | $C_nH_{2n+1}$ | OCF$_3$ | H | H | H |
| n-Am | $C_nH_{2n+1}$ | —C≡C—$C_mH_{2m+1}$ | H | H | H |
| n-Vm | $C_nH_{2n+1}$ | —CH=CH—$C_mH_{2m+1}$ | H | H | H |
| nV-Vm | $C_nH_{2n+1}$—CH=CH— | —CH=CH—$C_mH_{2m+1}$ | H | H | H |

The STN displays preferably contain liquid-crystalline mixtures composed of one or more compounds from Tables A and B.

TABLE A
(L¹, L², L³; each, independently of one another, H or F)
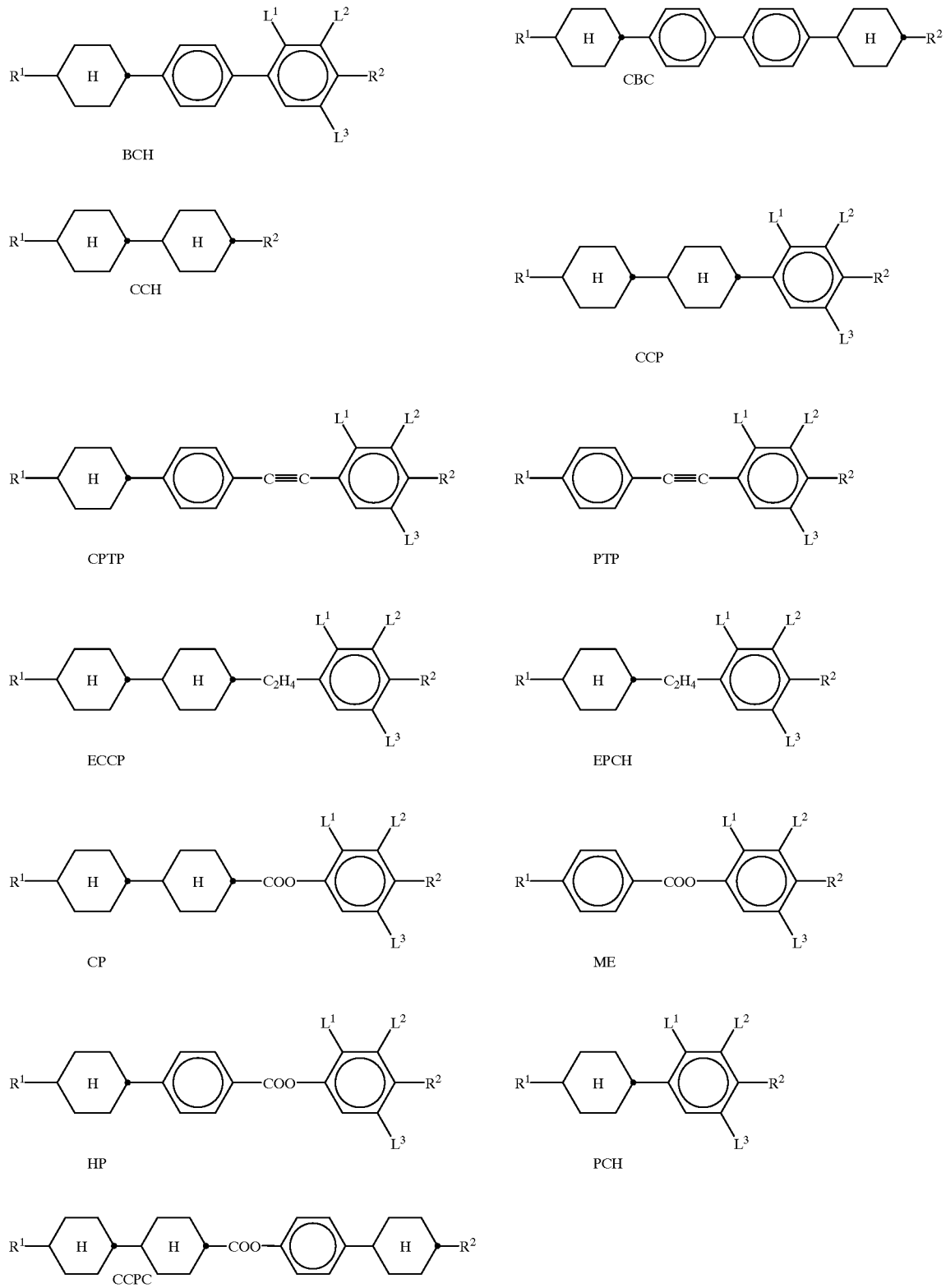

TABLE B
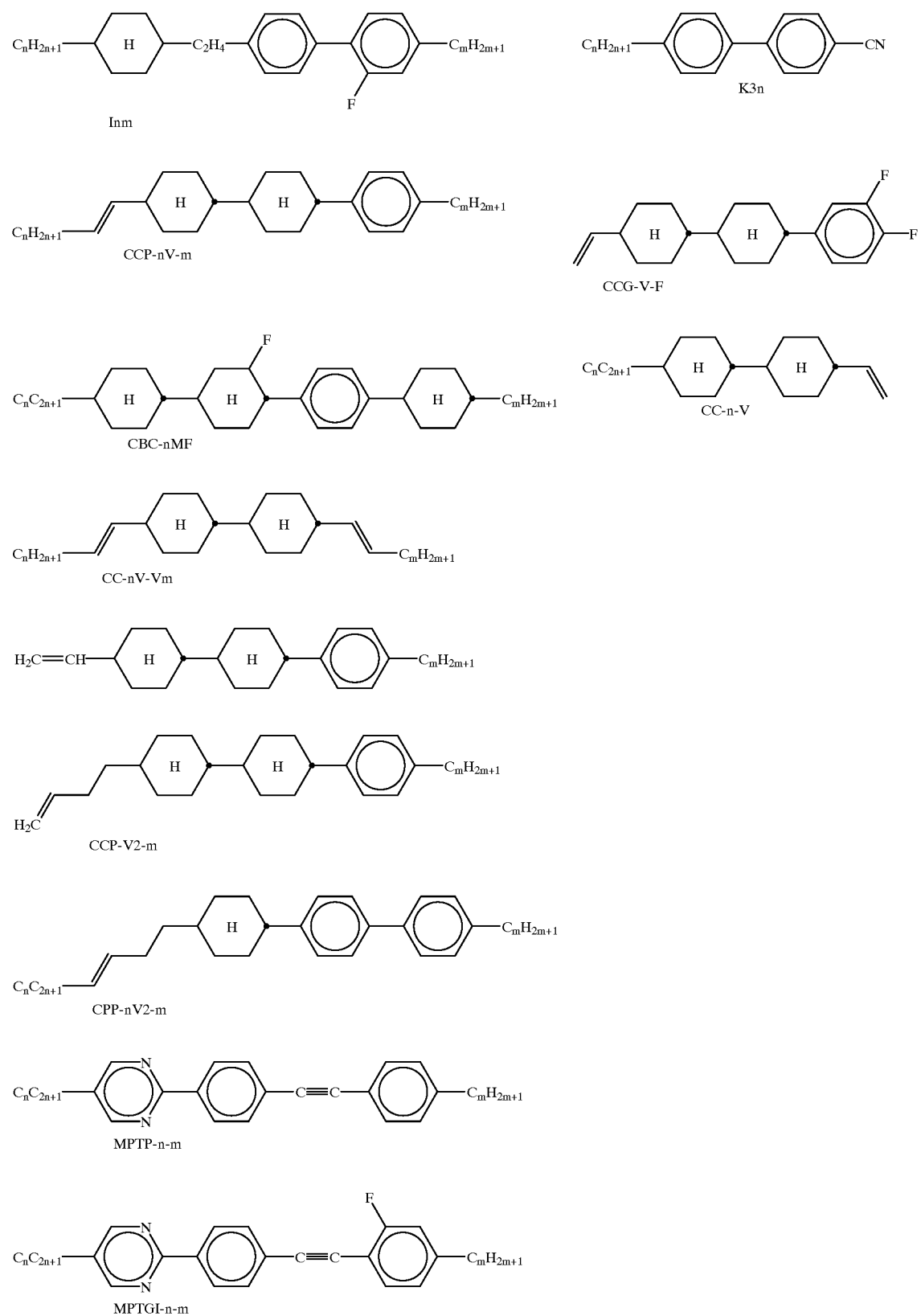

TABLE B-continued

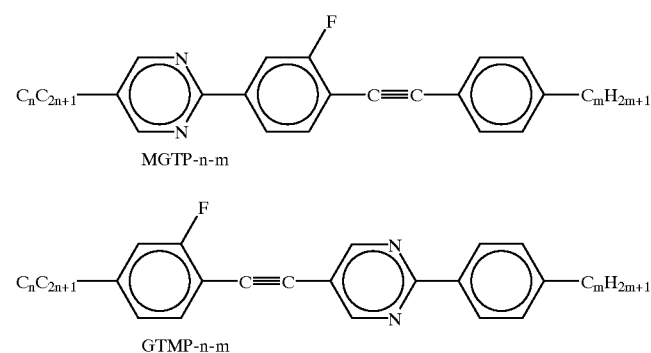

The examples below are intended to illustrate the invention without representing a limitation.

The following abbreviations are used:

| | |
|---|---|
| S-N | smectic-nematic phase transition temperature |
| N-I | nematic-isotropic phase transition temperature |
| c.p. | clearing point |
| visc. | rotational viscosity (mPa.s) |
| $\Delta n$ | optical anisotropy (589 nm, 20° C.) |
| $t_{on}$ | time from switching on until 90% of the maximum contrast is achieved |
| $t_{off}$ | time from switching off until 10% of the maximum contrast is achieved |
| steepness | $((V_{90}/V_{10}) - 1) \cdot 100\%$ |
| $V_{10}$ | threshold voltage = characteristic voltage at a relative contrast of 10% (also written for short as $V_{(10,0,20)}$) |
| $V_{90}$ | characteristic voltage at a relative contrast of 90% |
| p | pitch |
| $V_{op}$ | operating voltage |
| $t_{ave}$ | $\frac{t_{on} + t_{off}}{2}$ (average response time). |

Above and below, all temperatures are given in ° C. Percentages are percent by weight. The values for the response times and viscosities relate to 20° C., unless stated otherwise. The response time is, unless stated otherwise, the average value $t_{ave}$ of the switch-on and switch-off times.

The SLCD is, unless stated otherwise, addressed in multiplex operation (multiplex ratio 1:240, bias 1:16).

Mixture examples

| Example A | | | |
|---|---|---|---|
| PCH-2 | 10.0% | Clearing point [° C.]: | +105 |
| ME2N.F | 3.0% | Δε [1 kHz, 20° C.]: | +7.9 |
| ME3N.F | 3.0% | Δn [589 nm, 20° C.]: | +0.1351 |
| ME4N.F | 5.0% | STN 240° | 0.85 |
| CC-5-V | 20.0% | d · Δn [μm]: | |
| CCP-V-1 | 15.0% | $V_{(10,0,20)}$[V]: | 2.30 |
| CCP-V2-1 | 15.0% | Steepness [%]: | 7.1 |
| CCG-V-F | 10.0% | $t_{ave}$ [ms]: | 189 |
| CPP-1V2-2 | 10.0% | d/p: | 0.53 |
| MPTP-3-2 | 9.0% | | |
| Example B | | | |
| PCH-2 | 10.0% | Clearing point [° C.]: | +106 |
| ME2N.F | 3.0% | Δε [1 kHz, 20° C.]: | +7.5 |
| ME3N.F | 3.0% | Δn [589 nm, 20° C.]: | +0.1341 |
| ME4N.F | 5.0% | STN 240° | 0.85 |
| CC-5-V | 20.0% | d · Δn [μm]: | |
| CCP-V-1 | 15.0% | $V_{(10,0,20)}$[V]: | 2.34 |
| CCP-V2-1 | 15.0% | Steepness [%]: | 6.9 |
| CCG-V-F | 10.0% | $t_{ave}$ [ms]: | 222 |
| CPP-1V2-2 | 10.0% | d/p: | 0.53 |
| MPTGI-3-2 | 9.0% | | |
| Example C | | | |
| PCH-2 | 10.0% | Clearing point [° C.]: | +104 |
| ME2N.F | 3.0% | Δε [1 kHz, 20° C.]: | +7.8 |
| ME3N.F | 3.0% | Δn [589 nm, 20° C.]: | +0.1343 |
| ME4N.F | 5.0% | STN 240° | 0.85 |
| CC-5-V | 20.0% | d · Δn [μm]: | |
| CCP-V-1 | 15.0% | $V_{(10,0,20)}$[V]: | 2.29 |
| CCP-V2-1 | 15.0% | Steepness [%]: | 6.5 |
| CCG-V-F | 10.0% | $t_{ave}$ [ms]: | 203 |
| CPP-1V2-2 | 10.0% | d/p: | 0.53 |
| MGTP-3-2 | 9.0% | | |
| Example D | | | |
| PCH-2 | 10.0% | Clearing point [° C.]: | +104 |
| ME2N.F | 3.0% | Δε [1 kHz, 20° C.]: | +8.1 |
| ME3N.F | 3.0% | Δn [589 nm, 20° C.]: | +0.1352 |
| ME4N.F | 5.0% | STN 240° | 0.85 |
| CC-5-V | 20.0% | d · Δn [μm]: | |
| CCP-V-1 | 15.0% | $V_{(10,0,20)}$[V]: | 2.23 |
| CCP-V2-1 | 15.0% | Steepness [%]: | 7.1 |
| CCG-V-F | 10.0% | $t_{ave}$ [ms]: | 198 |
| CPP-1V2-2 | 10.0% | d/p: | 0.53 |
| GTMP-2-3 | 9.0% | | |

The preceding examples can be repeated with similar success by substituting the generically or specifically described reactants and/or operating conditions of this invention for those used in the preceding examples.

We claim:

1. A supertwist liquid-crystal display containing:
   two outer plates which, together with a frame, form a cell,
   a nematic liquid-crystal mixture of positive dielectric anisotropy which is present in the cell,
   electrode layers with alignment layers on the insides of the outer plates,
   a pretilt angle between the longitudinal axis of the molecules at the surface of the outer plates and the outer plates of from 1 degree to 30 degrees, and
   a twist angle of the liquid-crystal mixture in the cell from alignment layer to alignment layer with a value of between 100° and 600°,
   wherein the nematic liquid-crystal mixture consists of:
   a) 10–65% by weight of a liquid-crystalline component A consisting of one of more compounds having a dielectric anisotropy of greater the +1.5;

b) 20–90% by weight of a liquid-crystalline component B consisting of one or more compounds having a dielectric anisotropy of between −1.5 and +1.5;

c) 0–20% by weight of liquid-crystalline component D consisting of one or more compounds having a dielectric anisotropy of below −1.5, and d) optionally, an optically active component C in such an amount that the ratio between the layer thickness (separation of the outer plates) and the natural pitch of the chiral nematic liquid-crystal mixture is from about 0.2 and 1.3, wherein component A of the liquid-crystal mixture comprises at least one compound selected from those of the formulae 1A and 1B

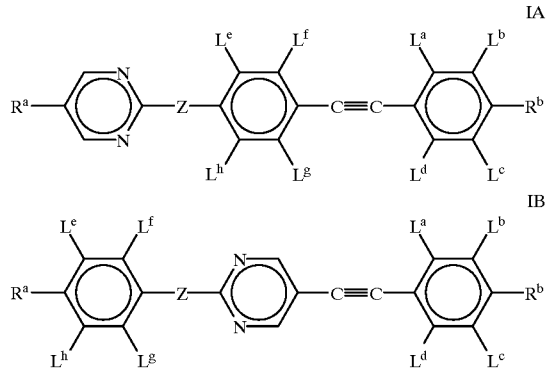

in which

R$^a$ is alkyl, alkoxy, alkenyl or alkenyloxy having 1 to 12 carbon atoms,

R$^b$ is alkyl, or alkoxy having 1 to 5 carbon atoms,

Z is —COO—, —CH$_2$CH$_2$— or a single bond, and

L$^a$, L$^b$, L$^c$, L$^d$, L$^e$, L$^f$, L$^g$, and L$^h$ in each case independently of one another are H or F, with the proviso that the 1,4-phenylene rings carry not more than 2 fluorine atoms per ring, and component B comprises at least one compound of the formula IC

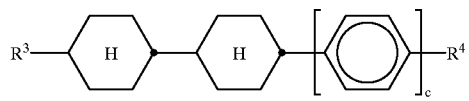

in which

R$^3$ is an alkenyl group having 2 to 7 carbon atoms,

R$^4$ is R$^a$ or R$^3$ and c is 0 or 1.

2. A liquid-crystal display according to claim 1, wherein component A of the liquid-crystal mixture comprises one or more compounds selected from those of the formulae IA1, IA2, IA3, IA4, IA5, IA6, IA7, IA8, IB1, IB2, IB3 and IB4

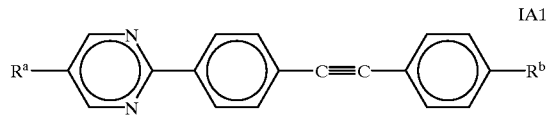

-continued

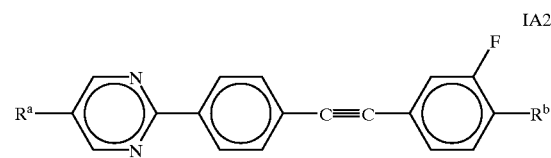

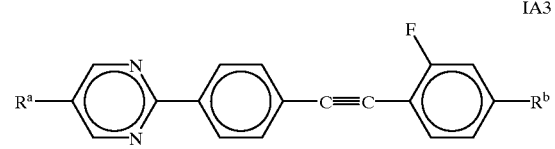

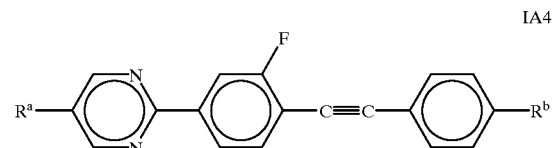

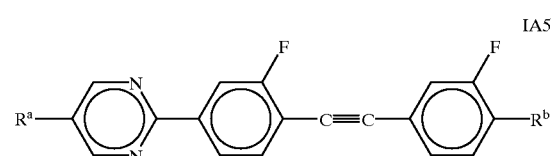

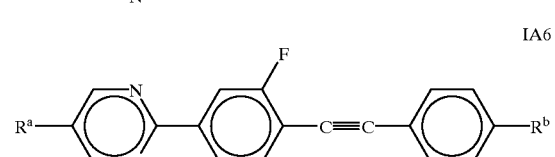

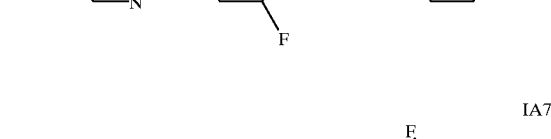

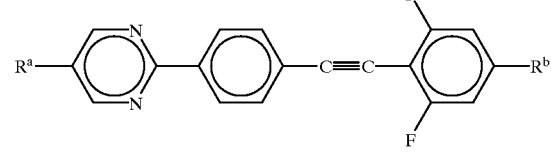

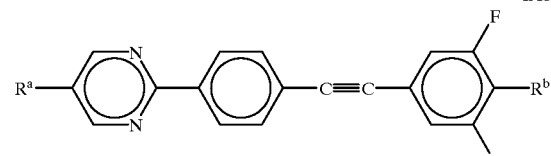

-continued

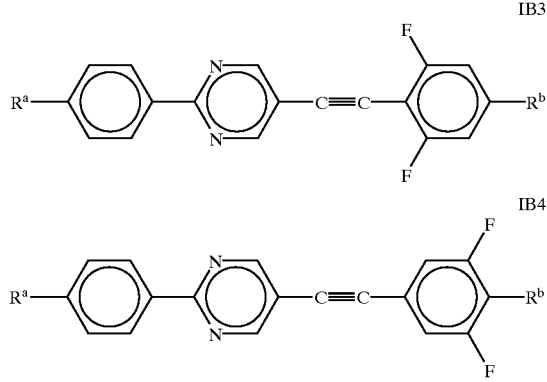

in which

R$^a$ and R$^b$ independently of one another are straight-chain alkyl having 1 to 5 carbon atoms.

3. A liquid-crystal display according to claim 1 wherein component B comprises at least one of the following compounds

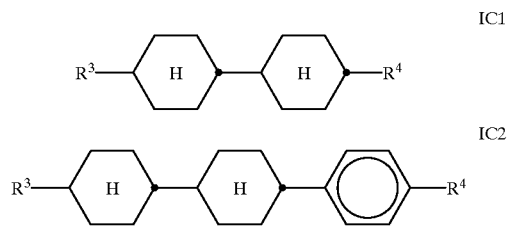

in which R$^3$ is 1E-aklenyl or 3E-alkenyl having 2 to 7 carbon atoms and R$^4$ possesses the meaning for R$^a$.

4. A liquid-crystal display according to claim 1 wherein component B comprises at least one of the following compounds

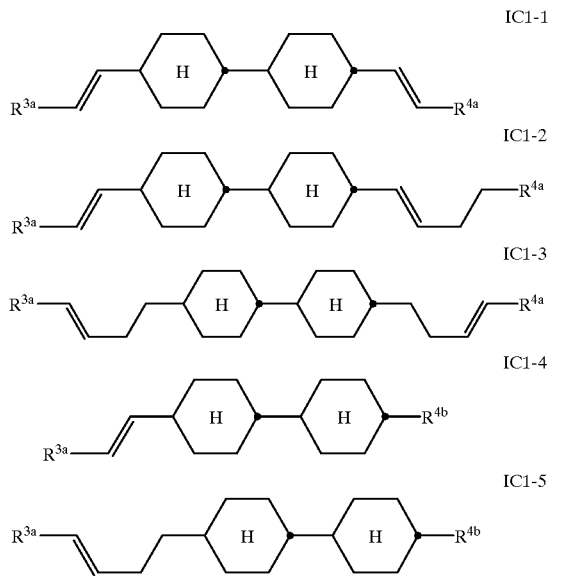

in which R$^{3a}$ and R$^{4a}$ are in each case independently of one another H, CH$_3$, C$_2$H$_5$ or n-C$_3$H$_7$ and R$^{4b}$ is n-alkyl having 1 to 8 carbon atoms.

5. A liquid-crystal display according to claim 1 wherein component B comprises at least one of the following compounds

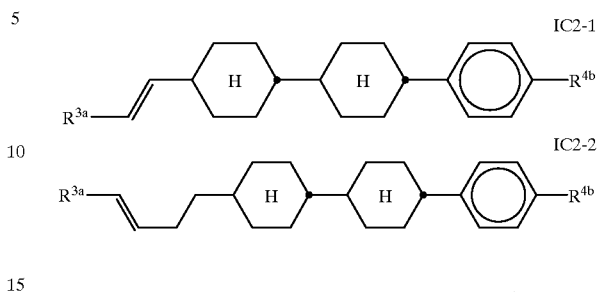

in which R$^{3a}$ is H, CH$_3$, C$_2$H$_5$, or n-C$_3$H$_7$ and R$^{4b}$ is n-alkyl having 1 to 8 carbon atoms.

6. A liquid-crystal display according to claim 1 wherein component A additionally comprises at least one compound of the formulae II or III

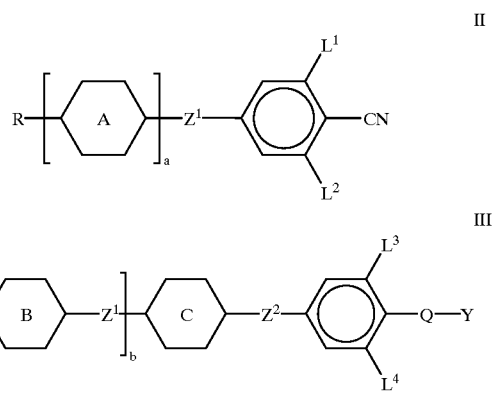

in which

R is an alkyl, alkoxy or alkenyl group having 1 to 12 carbon atoms, in which, in addition, one or two non-adjacent CH$_2$ groups are optionally replaced by —O—, —CH=CH—, —CO—, —OCO— or —COO— in such a way that 0 atoms are not linked directly to one another,

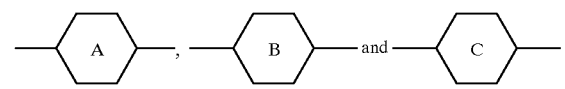

are each, independently of one another,

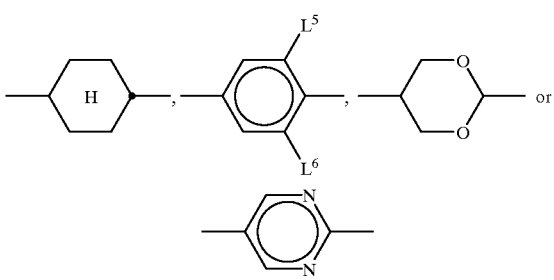

$L^1$ to $L^6$ are each, independently of one another, H or F,

| | |
|---|---|
| $Z^1$ | is —COO—, —CH$_2$CH$_2$— or a single bond, |
| $Z^2$ | is —CH$_2$CH$_2$—, —COO—, —C≡C— or a single bond, |
| Q | is —CF$_2$—, —CHF—, —OCF$_2$—, —OCHF— or a single bond, |
| Y | is F or Cl |
| a | is 1 or 2, and |
| b | is 0 or 1. |

7. A liquid-crystal display according to claim 1 wherein component A comprises at least one compound of one of the following formulae:

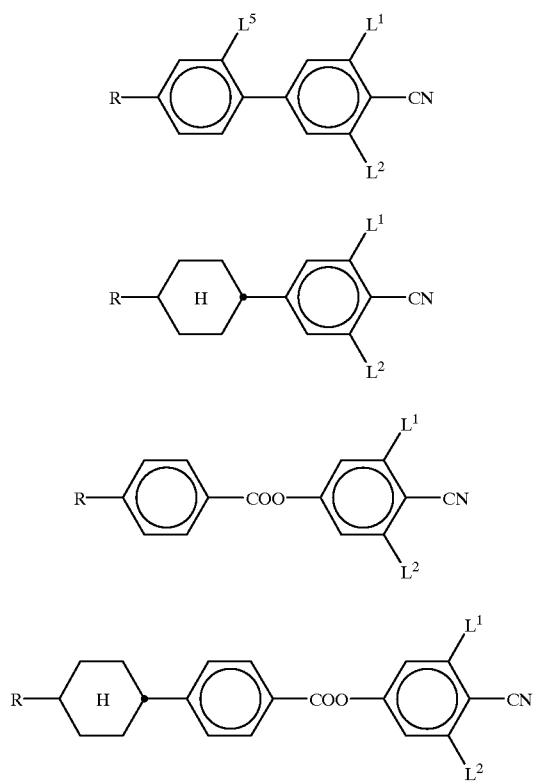

where

R is an alkyl, alkoxy or alkenyl group having 1 to 12 carbon atoms, in which, in addition, one or two non-adjacent CH$_2$ groups are optionally replaced by —O—, —CH=CH—, —CO—, —OCO— or —COO— in such a way that 0 atoms are not linked directly to one another, and $L^1$, $L^2$ to $L^5$ are H or F.

8. A liquid-crystal display according to claim 1 wherein component A comprises one or more compounds of the following formula:

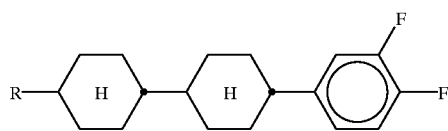

in which R is 1E-alkenyl or 3E-alkenyl having 2 to 7 carbon atoms.

9. A liquid-crystal display according to claim 1 wherein component A comprises one or more of the following compounds:

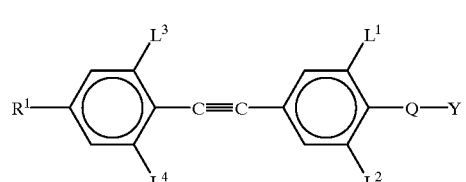

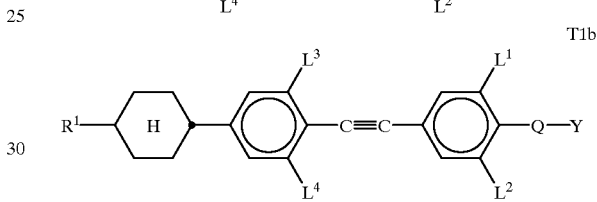

in which $R^1$ is an alkyl, alkoxy or alkenyl group having 1 to 12 carbon atoms, in which, in addition, one or two non-adjacent CH$_2$ groups are optionally replaced by —O—, —CH=CH—, —CO—, —OCO— or —COO— in such a way that 0 atoms are not linked directly to one another, $L^1$ to $L^4$ are each, independently of one another, H or F, and Q-Y is F, Cl or OCF$_3$.

10. A liquid-crystal display according to claim 1 wherein component B comprises one or more compounds selected from the group consisting of T2a to T2e:

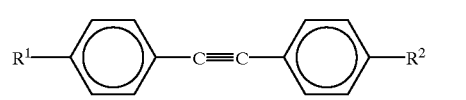

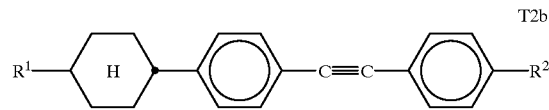

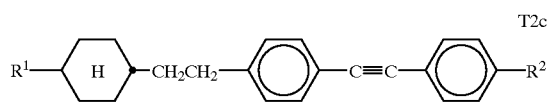

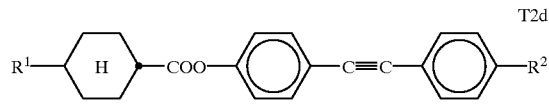

-continued

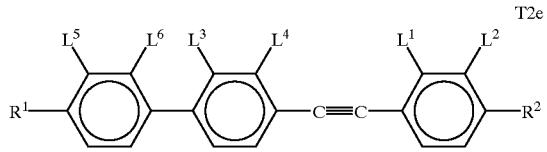

T2e in which $R^1$ and $R^2$ are each, independently of one another, an alkyl, alkoxy or alkenyl group having 1 to 12 carbon atoms, in which, in addition, one or two non-adjacent $CH_2$ groups are optionally replaced by —O—, —CH=CH—, —CO—, —OCO— or —COO— in such a way that 0 atoms are not linked directly to one another, and one, two or three radicals $L^1$ to $L^6$ are F and the others are H, where $L^1$ and $L^2$ or $L^3$ and $L^4$ or $L^5$ and $L^6$ are not both simultaneously F.

11. A liquid-crystal display according to claim 1 wherein component B additionally comprises one or more compounds of the formulae IV1 to IV24:

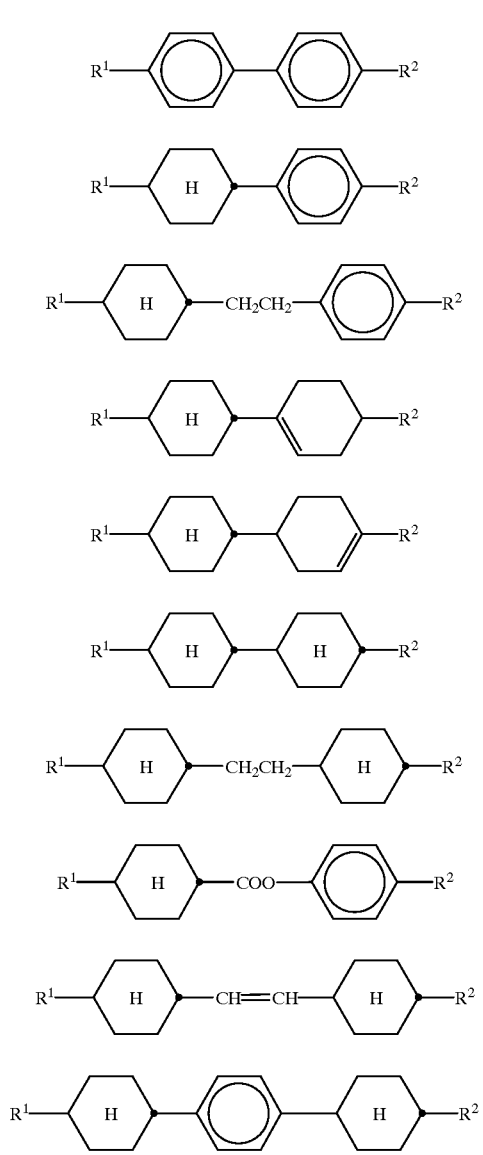

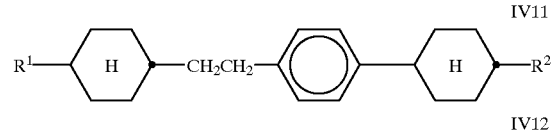

in which $R^1$ and $R^2$ are each, independently of one another, an alkyl, alkoxyl or alkenyl group having 1 to 12 carbon atoms, in which, in addition, one or two non-adjacent $CH_2$ groups are optionally replaced by —O—, —CH=CH—,— CO—, —OCO— or —COO— in such a way that any compounds of formula IV6 or IV16 are not the same as any compounds of formula IC in the mixture.

12. A nematic liquid-crystal mixture consisting of:
a) 10–65% by weight of a liquid-crystalline component A consisting of one or more compounds having a dielectric anisotropy of greater than +1.5;
b) 20–90% by weight of a liquid-crystalline component B consisting of one or more compounds having a dielectric anisotropy of between −1.5 and +1.5;
c) 0–20% by weight of a liquid-crystalline component D consisting of one or more compounds having a dielectric anisotropy of below −1.5, and
d) optionally, an optically active component C in such an amount that the ratio between the layer thickness (separation of the outer plates) and the natural pitch of the chiral nematic liquid-crystal mixture is from about 0.2 to 1.3,
wherein component A the liquid-crystal mixture comprises at least one compound selected from those of the formulae 1A and 1B

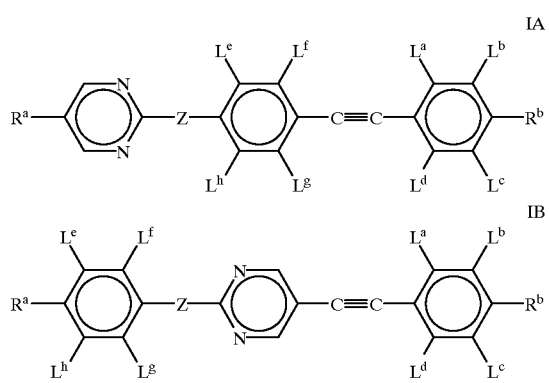

in which
$R^a$ is alkyl, alkoxy, alkenyl or alkenyloxy having 1 to 12 carbon atoms,
$R^b$ is alkyl or alkoxy having 1 to 5 carbon atoms,
Z is —COO—, —CH$_2$CH$_2$— or a single bond, and
$L^a$, $L^b$, $L^c$, $L^d$, $L^e$, $L^f$, $L^g$, and $L^h$ each case independently of one another are H or F,
with the proviso that the 1,4-phenylene rings carry not more than 2 fluorine atoms per ring,
and component B comprises at least one compound of the formula 1C

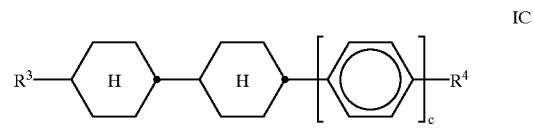

in which
$R^3$ is an alkenyl group having 2 to 7 carbon atoms,
$R^4$ is $R^a$ or $R^3$ and
c is 0 or 1.

13. The display of claim 1, wherein the nematic liquid-crystal mixture contains 5 to 20% by weight of component D.

14. The nematic liquid-crystal mixture of claim 12, wherein the nematic liquid-crystal mixture contains 5 to 20% by weight of component D.

15. The display of claim 1, wherein the nematic liquid-crystal mixture contains an amount of optically active component C.

16. The nematic liquid-crystal mixture of claim 12, wherein the nematic liquid-crystal mixture contains an amount of optically active component C.

17. The display of claim 15, wherein the nematic liquid-crystal mixture contains up to 10% by weight of optically active component C.

18. The nematic liquid-crystal mixture of claim 16, wherein the nematic liquid-crystal mixture contains up to 10% by weight of optically active component C.

19. The display of claim 1, wherein the nematic liquid-crystal mixture has a ratio between the layer thickness and natural pitch of 0.2 to 1.3.

20. The nematic liquid-crystal mixture of claim 12, wherein the nematic liquid-crystal mixture has a ratio between the layer thickness and natural pitch of 0.2 to 1.3.

* * * * *